US009102145B2

(12) United States Patent
Kubota et al.

(10) Patent No.: US 9,102,145 B2
(45) Date of Patent: Aug. 11, 2015

(54) LIQUID EJECTING HEAD AND METHOD FOR PRODUCING THE SAME

(71) Applicant: CANON KABUSHIKI KAISHA, Tokyo (JP)

(72) Inventors: Masahiko Kubota, Tokyo (JP); Ryoji Kanri, Zushi (JP); Akihiko Okano, Fujisawa (JP); Atsushi Hiramoto, Machida (JP); Masataka Sakurai, Kawasaki (JP); Yoshiyuki Fukumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 13/857,341

(22) Filed: Apr. 5, 2013

(65) Prior Publication Data

US 2013/0265368 A1 Oct. 10, 2013

(30) Foreign Application Priority Data

Apr. 10, 2012 (JP) ................................ 2012-089179

(51) Int. Cl.
*B41J 2/04* (2006.01)
*G01D 15/00* (2006.01)
*G11B 5/127* (2006.01)
(Continued)

(52) U.S. Cl.
CPC ................ *B41J 2/14* (2013.01); *B41J 2/14129* (2013.01); *B41J 2/1603* (2013.01); *B41J 2/1628* (2013.01); *B41J 2/1629* (2013.01); *B41J 2/1631* (2013.01); *B41J 2/1639* (2013.01); *B41J 2/1642* (2013.01); *B41J 2/1645* (2013.01); *B41J 2/1646* (2013.01); *B41J 2/1626* (2013.01); *B41J 2202/13* (2013.01)

(58) Field of Classification Search
CPC ...... B41J 2/1628; B41J 2/1631; B41J 2/1629; B41J 2/1603; B41J 2/1639
See application file for complete search history.

(56) References Cited

U.S. PATENT DOCUMENTS 5,478,606 A 12/1995 Ohkuma et al.
6,534,247 B2 3/2003 Milligan et al.
(Continued)

FOREIGN PATENT DOCUMENTS

EP 0 922 582 A2 6/1999
JP 5-116317 A 5/1993
(Continued)

OTHER PUBLICATIONS

Wikipedia Article: Deep Reactive Ion Etching, Section: Introduction.*
(Continued)

*Primary Examiner* — Lisa M Solomon
(74) *Attorney, Agent, or Firm* — Fitzpatrick, Cella, Harper & Scinto

(57) ABSTRACT

A method for producing a liquid ejecting head of the present invention includes the steps of: forming an etching stop layer on a portion corresponding to a region in which an independent supply port is formed, on a first face of a substrate; conducting dry etching treatment for the substrate from a second face side until the etched portion reaches the etching stop layer; and removing the etching stop layer by isotropic etching to form the independent supply port, after having conducted the dry etching treatment, wherein the isotropic etching is conducted in such a state that a side etching stopper portion having etching resistance to the isotropic etching is formed in the side face perimeter of the etching stop layer.

7 Claims, 14 Drawing Sheets

(51) Int. Cl.

| | |
|---|---|
| ***B41J 2/14*** | (2006.01) |
| ***B41J 2/16*** | (2006.01) |

(56) References Cited

U.S. PATENT DOCUMENTS

| | | | | |
|---|---|---|---|---|
| 6,895,668 | B2 | 5/2005 | Imamura | |
| 7,591,531 | B2 | 9/2009 | Tsuchii et al. | |
| 7,909,432 | B2 | 3/2011 | Tsuchii et al. | |
| 8,083,318 | B2 | 12/2011 | Tsuchii et al. | |
| 8,083,325 | B2 | 12/2011 | Inoue et al. | |
| 8,647,896 | B2 * | 2/2014 | Sakai | 438/21 |
| 2001/0002135 | A1 | 5/2001 | Milligan et al. | |
| 2006/0077221 | A1 | 4/2006 | Vaideeswaran et al. | |
| 2009/0065472 | A1 | 3/2009 | Asai et al. | |
| 2009/0212008 | A1 | 8/2009 | Uyama et al. | |
| 2009/0314742 | A1 * | 12/2009 | Kishimoto et al. | 216/27 |
| 2012/0069094 | A1 | 3/2012 | Okano et al. | |

FOREIGN PATENT DOCUMENTS

| | | | |
|---|---|---|---|
| JP | 6-286149 | A | 10/1994 |
| JP | 2000-326515 | A | 11/2000 |
| JP | 3143307 | B2 | 3/2001 |
| JP | 2003-311972 | A | 11/2003 |
| JP | 2006-150744 | A | 6/2006 |
| JP | 2009-039914 | A | 2/2009 |
| JP | 2009-196244 | A | 9/2009 |

OTHER PUBLICATIONS

Wikipedia Article: Etching (microfabrication), Section: Wet Etching.*

Wikipedia Article: Deep Reactive Ion Etching, Section: Introduction, Apr. 24, 2013.*

Wikipedia Article: Etching (microfabrication), Section: Wet Etching, Sep. 12, 2014.*

Office Action in Chinese Application No. 201310123781.9 (issued Oct. 21, 2014).

* cited by examiner

LIQUID EJECTING HEAD AND METHOD FOR PRODUCING THE SAME

BACKGROUND OF THE INVENTION

1. Field of the Invention

The present invention relates to a liquid ejecting head and a method for producing the same.

2. Description of the Related Art

An ink jet recording head for ink jet printing generally includes an ejection port for ejecting a solution, a liquid flow channel in communication with the ejection port, and an ejection energy generating element provided in the liquid flow channel. This ink jet recording head is broadly divided into two forms, from the viewpoint of a positional relationship between the ejection energy generating element and the ejection port. In the two forms, one is an edge shooter type ink jet head in which a growth direction of an air bubble is different from an ejection direction thereof (almost vertical), and the other is a side shooter type ink jet head in which the growth direction of the air bubble is almost same as the ejection direction thereof.

The side shooter type ink jet head can be produced, for instance, according to the following steps (1) to (4): (1) a step of forming a mold pattern of the ink flow channel on a substrate (base substance) having the ejection energy generating element formed thereon by using a dissolvable resin; (2) a step of forming a flow-channel forming member which constitutes a wall of the ink flow channel, by solvent-coating a coating resin containing an epoxy resin on the mold pattern; (3) a step of forming the ink ejection port in a coating resin layer which exists above the ejection energy generating element; and (4) a step of dissolving out the mold pattern which is formed of a dissolvable resin.

The above described production method will be described in detail below with reference to FIGS. 1A to 1E.

First, as is illustrated in FIG. 1A, the mold pattern 23 of the ink flow channel is formed on the substrate 21 which has the ejection energy generating element 22 formed on its first face (which is also referred to as surface), with the use of the dissolvable resin.

Here, a desired number of the ejection energy generating elements 22 such as an electrothermal conversion element, a piezoelectric element or the like are arranged on the substrate 21. An energy for ejecting an ink small drop as a recording liquid is given to the ink by the ejection energy generating element 22.

When the electrothermal conversion element is used as the ejection energy generating element 22, the electrothermal conversion element heats the recording liquid in the vicinity thereof, thereby causes the change in a state of the recording liquid, and generates ejection energy. In addition, when the piezoelectric element is used as the ejection energy generating element 22, the ejection energy is generated by mechanical vibration of the piezoelectric element.

Subsequently, as in FIG. 1B, the coating resin layer 24 having photosensitivity is further formed on the mold pattern 23 which serves as a mold of the ink flow channel, with a spin coating method, a roll coating method or the like.

Subsequently, as in FIG. 1C, the ejection port 25 is formed by the exposure of the coating resin layer 24 to light through a mask having the pattern and the development of the exposed coating resin layer.

A negative type resist, for instance, can be used for the photosensitive coating resin layer 24. When the coating resin layer 24 is the negative type resist, a portion (not-shown) on which the ejection port is formed and a portion (not-shown) for electrical connection thereon are shielded by a mask.

A light source to be used for the pattern exposure can be appropriately selected from ultraviolet light, Deep-UV light, an electron beam, X-rays or the like, according to a photosensitizing region of a cationic photopolymerization initiator to be used.

Subsequently, as is illustrated in FIG. 1D, an ink supply port 27 for supplying the ink to the ink flow channel therethrough is formed. At this time, in order to avoid a damage to the coating resin layer 24 which serves as a nozzle member, a face of the silicon substrate on which the nozzle has been formed may be protected by a protective material 26 such as a cyclized rubber. In addition, the protective layer may be removed after the ink supply port 27 has been formed.

In addition, the ink supply port can be formed with any method as long as a through hole can be formed in the substrate 21. The ink supply port may be formed, for instance, mechanically with a drill or the like, or may also be formed with the use of light energy of a laser or the like. In addition, the through hole may be formed by steps of forming a resist pattern on the substrate 21 and chemically etching the substrate.

Subsequently, as is illustrated in FIG. 1E, the mold pattern 23 formed of the dissolvable resin is dissolved out by a solvent, and the ink flow channel is formed.

The mold pattern 23 is easily dissolved out by immersing the substrate in the solvent or spraying the solvent to the substrate with a spray. In addition, if an ultrasonic wave or the like has been used together, a dissolving period of time can be further shortened.

With the substrate 21 having the ink flow channel and the ink ejection port formed thereon in this way, members for supplying the ink are attached and electrical connections (not-shown) for driving the ejection energy generating element 22 are provided to complete the ink jet recording head.

Japanese Patent Application Laid-Open No. H05-116317 discloses a liquid ejecting head that has a structure which has an orifice opposing to a thermal energy supply unit, and has nozzle walls arranged in two different directions from each other when viewed from the thermal energy generating unit, in the vicinity of the thermal energy generating unit.

In addition, U.S. Pat. No. 6,534,247 describes a method for forming a liquid ejecting head according to the following steps of: (1) arranging an inorganic insulation film on the upper face and the lower face of a heater layer, and forming an independent supply port (Ink Feed) in the vicinity of a heater first from the surface of a substrate for an ink jet recording head; (2) forming a first common ink supply port by anisotropic etching from the rear face of the substrate for the recording head, with the use of a strong alkaline etchant; and (3) applying a resist onto the substrate with a spray coater or the like to form the film, patterning the resist film, and then forming a second common ink supply port to make the second common ink supply port communicate with the above described independent supply port. In U.S. Pat. No. 6,534,247, the independent supply port is formed from the surface of the substrate for the ink jet recording head, and accordingly such a step is not needed as to remove an inorganic insulation film arranged on the upper face and the lower face of the heater layer, from the rear face of the substrate through the independent supply port. However, it is difficult to stack nozzles on the above described substrate for the ink jet recording head with high accuracy, after deep independent supply ports have been formed on the surface. In addition, a material for temporarily plugging the above described independent supply ports also becomes necessary, and a process of uniformly plugging this plugging material also becomes complicated. Furthermore, it is needed to stably remove the above described plugging material at the end in order to form the nozzles.

In addition, Japanese Patent Application Laid-Open No. 2006-150744 discloses the following method of producing an ink jet recording head. Specifically, the method includes arranging a TaSiN film which is a heater film, between a P—SiO film and a P—SiN film in a region in which a common ink supply port is formed, in an ink jet recording head disclosed in Japanese Patent Application Laid-Open No. H06-286149, and anisotropically etching the region. Then, when the P—SiO film is removed by a solution having acidity such as a BHF solution, the method prevents a damage to the above described dissolvable resin material layer 23, the above described photosensitive coating resin layer 24 and the like, through the P—SiN film.

In addition, Japanese Patent Application Laid-Open No. 2009-039914 and Japanese Patent Application Laid-Open No. 2009-196244 disclose a structure that specifies a nozzle arrangement configuration of the recording head, which achieves such a symmetrical nozzle configuration that the nozzles are filled with ink through independent supply ports in a head having the independent supply ports, and specifies an arrangement configuration of the independent supply ports.

SUMMARY OF THE INVENTION

One embodiment of the present invention is a method for producing a liquid ejecting head comprising a substrate which has an ejection energy generating element that generates energy for ejecting a liquid, on its first face, and an independent supply port that reaches the first face from a side of a second face which is opposite to the first face, which includes: (1) a step of forming an etching stop layer on a portion corresponding to a region in which the independent supply port is formed, on the first face; (2) a step of conducting dry etching treatment for the substrate from the second face side until the etched portion reaches the etching stop layer; and (3) a step of removing the etching stop layer by isotropic etching to form the independent supply port, after having conducted the dry etching treatment, wherein the isotropic etching is conducted in such a state that a side etching stopper portion having etching resistance to the isotropic etching is formed in the side face perimeter of the etching stop layer.

The side etching stopper portion has a function of suppressing side etching which occurs when an etching stop layer such as a silicon oxide film that has been formed with the use of plasma is removed.

Another embodiment of the present invention is a liquid ejecting head comprising a substrate which has an ejection energy generating element that generates energy for ejecting a liquid, on its first face, and an independent supply port that reaches the first face from a side of a second face which is opposite to the first face, and a resin substrate which constitutes an ejection port that ejects the liquid and a liquid flow channel in communication with the ejection port and the independent supply port, and is provided on the first face of the substrate, wherein the independent supply port has an inner wall including an upper end portion, on the first face side, formed of a metal protection film.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An object of the present invention is to provide a method for producing a liquid ejecting head, which can control a dimension of an aperture in the surface side of an independent supply port with high accuracy.

The present embodiment relates to a method for producing a liquid ejecting head that includes a substrate which has an ejection energy generating element that generates energy for ejecting a liquid, on its first face (surface), and an independent supply port that reaches the first face from a side of a second face (rear face) which is a face in the opposite side to the first face. In addition, the present embodiment includes: a step (1) of forming an etching stop layer on a portion corresponding to a region in which the above described independent supply port is formed, on the above described first face. In addition, the present embodiment includes: a step (2) of conducting dry etching treatment for the above described substrate from the second face side until the etched portion reaches the above described etching stop layer. In addition, the present embodiment includes: a step (3) of removing the above described etching stop layer by isotropic etching to form the above described independent supply port, after having conducted the above described dry etching treatment. In the present embodiment, the above described isotropic etching is conducted in such a state that a side etching stopper portion having etching resistance to the above described isotropic etching is formed in the side face perimeter of the above described etching stop layer.

The method according to the present invention can control the dimension of the aperture on the first face side of the independent supply port with high accuracy. Accordingly, the method can form a distance and a shape between the ejection energy generating element and the independent supply port or a distance and a shape between the ejection port and the independent supply port, and the like, with high accuracy.

Embodiments of the present invention will be described in detail below.

Figure 1A:
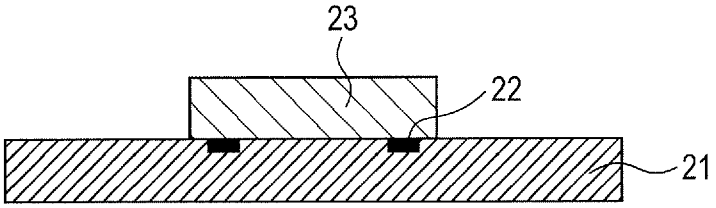
FIGS. 1A, 1B, 1C, 1D and 1E are sectional views of steps for describing steps of producing a conventional ink jet recording head.
Figure 1B:
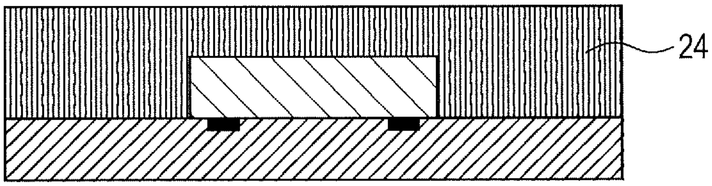
Figure 1C:
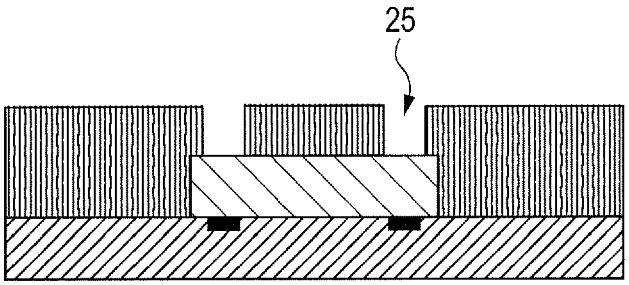
Figure 1D:
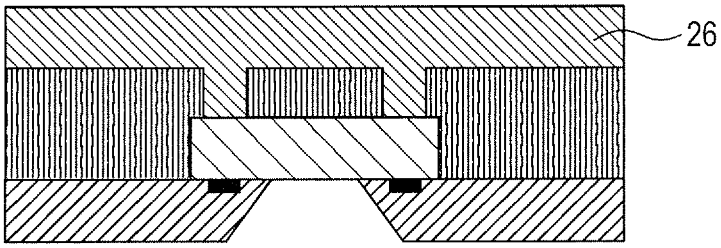
Figure 1E:
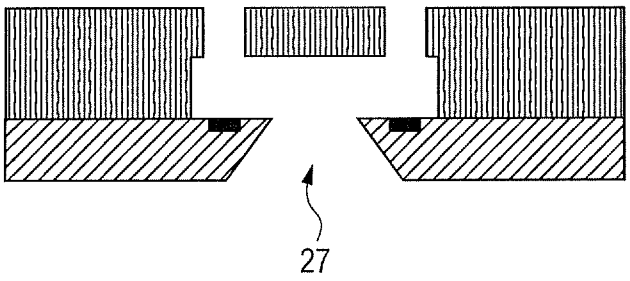
Figure 2A:
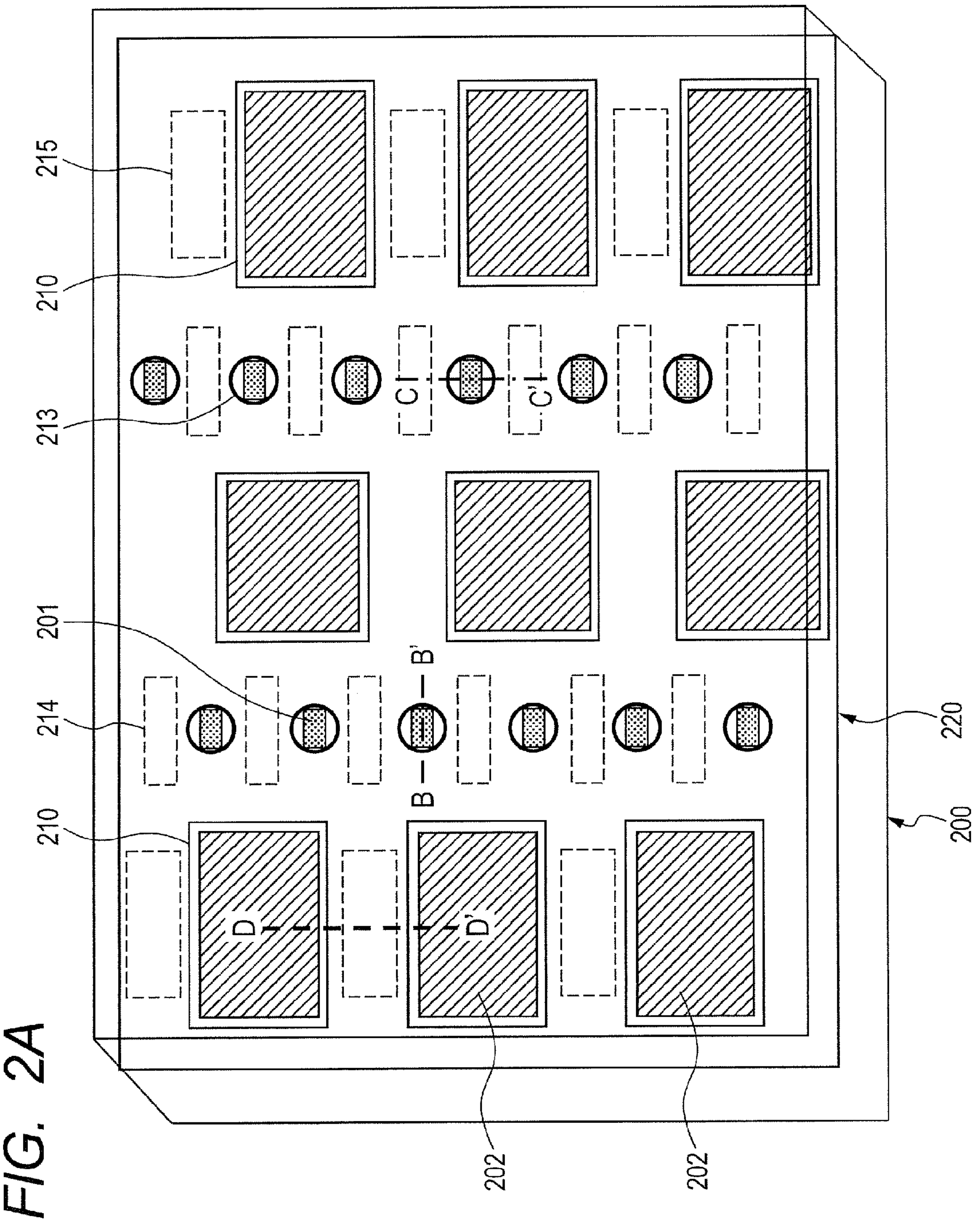
FIG. 2A is a perspective view of an ink jet recording head according to the present embodiment.

FIG. 2A illustrates a schematic perspective view of an ink jet recording head according to the present embodiment. In FIG. 2A, a resin substrate 220 is stacked on a semiconductor substrate 200. A heater 201 of the ejection energy generating element is arranged on the first face (surface) of the semiconductor substrate 200. In addition, an independent supply port 202 is formed so as to penetrate the semiconductor substrate 200 from a second face (rear face) which is a face in the opposite side to the first face, to the first face, in the semiconductor substrate. In addition, a side etching stopper portion 210 is provided along the aperture in the first face side of the independent supply port.

The resin substrate 220 constitutes an ink ejection port 213 and an ink flow channel in communication with the ink ejection port 213, and an ink which has been supplied to the ink flow channel from the independent supply port 202 is ejected from the ink ejection port 213. The resin substrate 220 has a nozzle wall 214 which reduces interference between an air bubble that has been generated in the heater 201 and an air bubble that is generated in an adjacent heater. In addition, the air bubble which has been generated in the heater 201 makes an ink drop fly from the ink ejection port 213. In addition, a strut 215 which controls the flow of the ink from the independent supply port 202 to the heater 201 and prevents the resin substrate from being depressed is formed between a plurality of the independent supply ports 202, in the resin substrate 220.

Figure 2B:
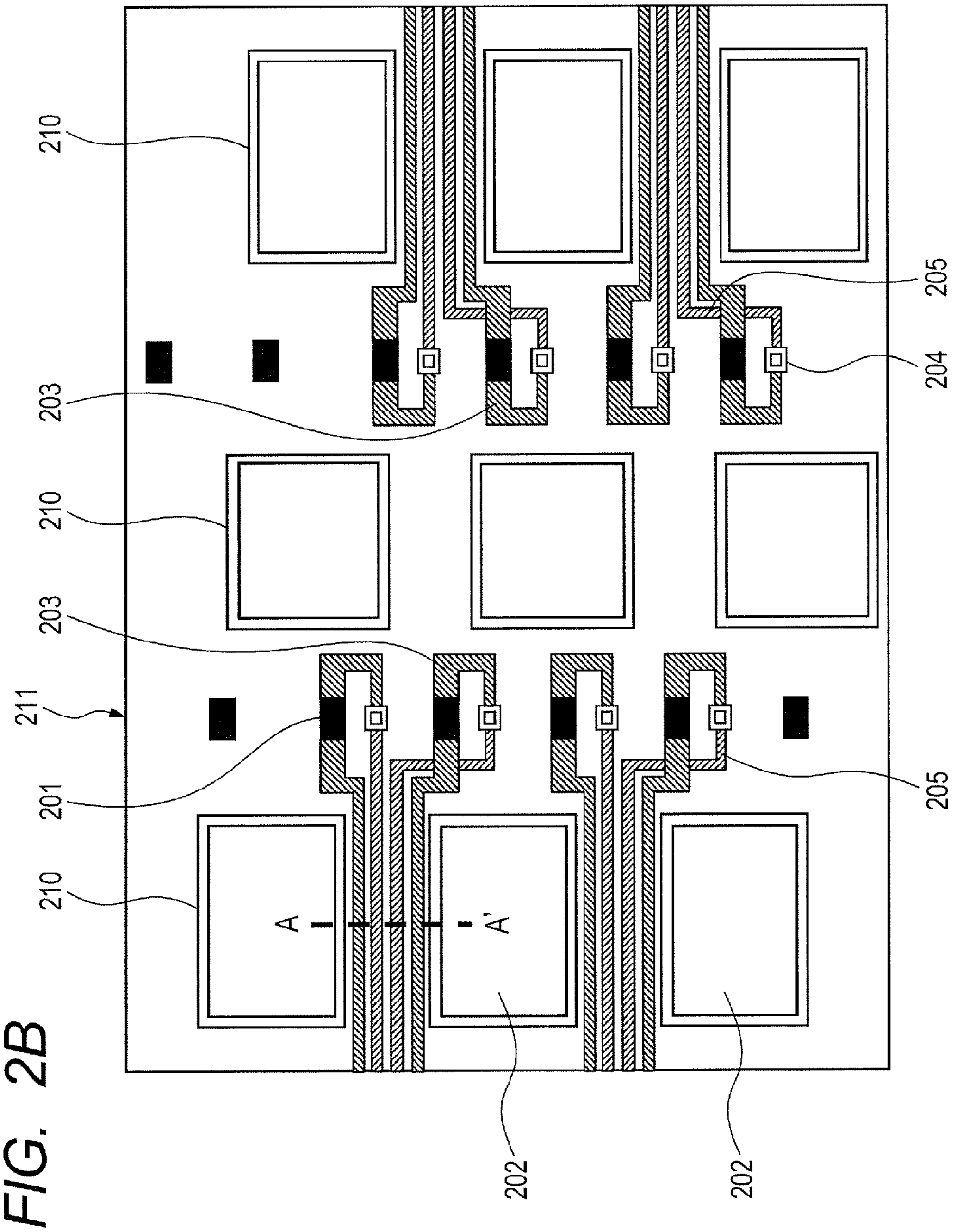
FIG. 2B is a schematic top plan view of a region including a heater and an independent supply port of a substrate for an ink jet recording head according to the present embodiment.

FIG. 2B illustrates a schematic top plan view of the substrate for the ink jet recording head according to the present embodiment.

FIG. 2B is a view of a semiconductor substrate (which is also referred to as substrate for ink jet recording head) that has the independent supply port 202 arranged therein which is formed for supplying an ink to the ink flow channel formed on the substrate for the ink jet recording head, when viewed from the upper face. In FIG. 2B, the heater 201 generates air bubbles, a first electric wiring layer 205 is electrically connected to the heater 201, a second electric wiring layer 203 is shown, and a through hole portion 204 connects the first electric wiring layer 205 with the second electric wiring layer 203. All of the heater 201, the first electric wiring layer 205, the second electric wiring layer 203 and the through hole portion are formed on a thermal oxide film (which is also referred to as Field-Ox film) which is formed in a high-temperature process (LOCOS step) of 800° C. or higher.

A silicon oxide film (P—SiO film) which forms an interlayer insulation layer between the first electric wiring layer 205 and the second electric wiring layer 203 is formed with a plasma CVD method. Incidentally, the silicon oxide film (P—SiO film) is removed in the through hole portion 204.

The silicon oxide film (P—SiO film) which forms the interlayer insulation layer also has a function of the etching stop layer working when the independent supply port 202 is formed by dry etching of silicon starting from the rear face of the semiconductor substrate 200, which will be described later. In addition, in the perimeter of the aperture on the first face side of the independent supply port 202, a side etching stopper portion 210 is arranged which suppresses side etching when the silicon oxide film (P—SiO film) is removed, and specifies the diameter of the aperture of the independent supply port 202.

The ink jet recording head of the present embodiment illustrated in FIG. 2A has a form in which the resin substrate 220 is stacked on the substrate for the ink jet recording head illustrated in FIG. 2B. In the resin substrate 220, a nozzle wall 214 (which is also referred to as flow channel wall) is formed for reducing interference between the air bubble which has been generated in the heater 201 and the air bubble which has been generated in the adjacent heater, and stably making a certain amount of the ink drop fly from the ejection port 213. A plurality of the ink ejection ports 213 are arranged between the rows of a plurality of the heaters 201. In addition, the struts 215 for making the ink ejection port 213 stably filled with the ink from the independent supply port 202 are each arranged between the plurality of the independent supply ports 202. The strut 215 also functions as a support for an orifice plate which is formed on the resin substrate 220. In the inner peripheral portion of the independent supply port 202, the side etching stopper portion 210 is arranged which specifies the diameter of the aperture of the independent supply port 202 with high accuracy, and the heater 201 can be stably filled with the ink at a high speed.

Next, an action of the base substance for the recording head including the substrate for the ink jet recording head illustrated in FIG. 2B will be described below.

A driving voltage is supplied to the heater 201 from a common electric wiring (not-shown) through the second electric wiring layer 203. In addition, the second electric wiring layer 203 is connected to the first electric wiring layer 205 through the through hole portion 204, and is connected to a function element (not-shown) which individually drives the heater 201. The configuration of the substrate for the ink jet recording head including the function element, and the method for producing the same are disclosed in FIGS. 3A to 3C.

Figure 3A:
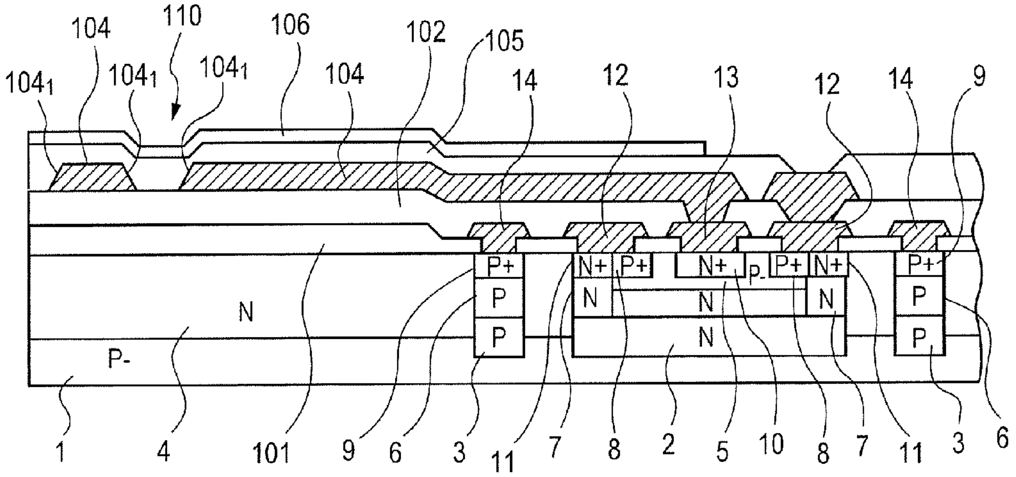
FIGS. 3A, 3B and 3C are schematic sectional views for describing a configuration example of the substrate for the ink jet recording head according to the present embodiment.

FIG. 3A is a schematic sectional view of the substrate for the ink jet recording head, when the main elements on the substrate are supposed to be longitudinally cut.

As is illustrated in FIG. 3A, first, a silicon oxide film with a thickness of approximately 8,000 Å is formed on the surface of a P-type silicon substrate 1 (impurity concentration of approximately $1\times10^{12}$ to $1\times10^{16}$ $cm^{-3}$), and then a silicon oxide film in a portion on which an N-type collector embedded region 2 of each cell is formed is removed by a photolithography step. After the silicon oxide film is formed, ions of an N-type impurity (for instance, P, As or the like) are implanted into the silicon oxide film, and the N-type collector embedded region 2 is formed by thermal diffusion, which has a thickness of approximately 2 to 6 μm and has an impurity concentration of $1\times10^{18}$ $cm^{-3}$ or more so that a sheet resistance becomes as low as a resistance of 80Ω/□ or less. Subsequently, a silicon oxide film on a region in which a P-type isolation embedded region 3 is formed is removed, and a silicon oxide film of approximately 1,000 Å is formed. After that, ions of a P-type impurity (for instance, B or the like) are implanted into the silicon oxide film, and the P-type isolation embedded region 3 having an impurity concentration of $1\times10^{15}$ to $1\times10^{17}$ $cm^{-3}$ or more is formed by thermal diffusion.

Next, the silicon oxide film on the whole surface is removed, and then an N-type epitaxial region 4 (impurity concentration of approximately $1\times10^{13}$ to $1\times10^{15}$ $cm^{-3}$) is epitaxially grown so as to have a thickness of approximately 5 to 20 μm.

Next, a silicon oxide film with a thickness of approximately 1,000 Å is formed on the surface of the N-type epitaxial region 4, a resist is applied onto the silicon oxide film, the silicon oxide film is patterned, and ions of a P-type impurity are implanted only into a portion in which a low-concentration P-type base region 5 is formed. The resist is removed, and then the low-concentration P-type base region 5 (impurity concentration of approximately $1\times10^{14}$ to $1\times10^{17}$ $cm^{-3}$) is formed so as to have a thickness of approximately 5 to 10 μm, by thermal diffusion.

The P-type base region 5 can be formed also by removing the oxide film after the P-type isolation embedded region 3 has been formed, and then growing a low-concentration P-type epitaxial layer of approximately $5\times10^{14}$ to $5\times10^{17}$ to 3 to 10 μm.

After that, the whole silicon oxide film on the surface is removed again, and a silicon oxide film with a thickness of approximately 8,000 Å is further formed. After that, the silicon oxide film in a region in which a P-type isolation region 6 should be formed is removed, and a BSG film is deposited on the whole surface with the use of a CVD method. Furthermore, the P-type isolation region 6 (impurity concentration of approximately $1\times10^{18}$ to $1\times10^{20}$ $cm^{-3}$) is formed so as to reach the P-type isolation embedded region 3 and have a thickness of approximately 10 μm, by thermal diffusion. Here, it is also possible to form the P-type isolation region 6 by using $BBr_3$ as a diffusion source.

In addition, when the P-type epitaxial layer is used as described above, the structure can be formed in which the above described P-type isolation embedded region 3 and P-type isolation region 6 are not needed. In this case, it is also possible to eliminate a photolithography step for forming the P-type isolation embedded region 3, the P-type isolation region 6 and the low-concentration base region 5, and a high-temperature step for diffusing the impurity.

Next, the BSG film is removed, then a silicon oxide film with a thickness of approximately 8,000 Å is formed, and furthermore, a silicon oxide film is removed only in a portion on which the N-type collector region 7 is formed. After that, the N-type collector region 7 (impurity concentration of approximately $1\times10^{18}$ to $1\times10^{20}$ $cm^{-3}$) is formed so as to reach the collector embedded region 5 and have a low sheet resistance of 10Ω/□ or less by the diffusion of an N-type solid phase and the implantation of ions of phosphorus or thermal diffusion. At this time, the thickness of the N-type collector region 7 has been set at approximately 10 μm. Subsequently, the silicon oxide film with a thickness of approximately 12,500 Å is formed to form a thermal storage layer 101, and then the silicon oxide film in cell regions is selectively removed.

The thermal storage layer 101 can be formed by the formation of a thermal oxide film of silicon with a thickness of 1,000 to 3,000 Å, after the N-type collector region 7 has been formed. In addition, a film of BPSG (silicate glass containing boron and phosphorus), PSG (silicate glass containing phosphorus), $SiO_2$, SiON or SiN may be formed as the thermal storage layer 101, with a CVD method, a PCVD method, a sputtering method or the like. After that, a silicon oxide film of approximately 2,000 Å is formed.

Next, the silicon oxide film is patterned with the use of a resist, and a P-type impurity is injected only to portions on which a high-concentration base region 8 and a high-concentration isolation region 9 are formed. The resist is removed, the silicon oxide film in a region in which an N-type emitter region 10 and a high-concentration N-type collector region 11 should be formed is removed, and a thermal oxide film is formed on the whole surface. After that, an N-type impurity is injected into the thermal oxide film, and then the N-type emitter region 10 and the high-concentration N-type collector region 11 are simultaneously formed by thermal diffusion. Incidentally, thicknesses of the N-type emitter region 10 and the high-concentration N-type collector region 11 are each 1.0 μm or less, for instance, and the impurity concentrations thereof are each approximately $1\times10^{18}$ to $1\times10^{20}$ $cm^{-3}$.

Furthermore, a silicon oxide film in a portion at which an electrode is connected is partially removed, an AL1 layer is deposited on the whole surface, and the AL1 film is partially removed except the electrode region.

Then, a silicon oxide film (P—SiO film) which serves as an interlayer insulation film 102 and has also a function as the thermal storage layer is formed on the whole surface so as to have a thickness of approximately 0.6 to 1.0 μm, at a temperature of 250° C. with a plasma CVD method.

This interlayer insulation film 102 may also be formed with a normal pressure CVD method. In addition, the interlayer insulation film 102 is not limited to the SiO film, but may also be an $SiO_xN_y$ film, an $SiO_x$ film or an $SiN_x$ film. However, it is not desirable that the film is formed at a high temperature of 300° C. or higher, in consideration of a damage to the elements which have been formed on the lower layer. In addition, when the film has been formed at a low temperature of 100° C. or lower, such a dense film as to be capable of keeping insulation between the electric wiring layers may not be formed. From the above described reasons, a film formation temperature is preferably 100° C. to 300° C., and is more preferably 200° C. to 250° C.

Next, one part of the interlayer film 102 which exists on the upper parts of an emitter region and a base/collector region is opened with a photolithography method, and a through hole TH is formed for producing electrical connection.

It is possible to use an etchant of mixed acids such as $NH_4F+CH_3COOH+HF$, when etching an insulation film such as the interlayer insulation film 102 and the protection film 105. It is also possible to make the etched sectional shape tapered (while the angle is 30 degrees or more and 75 degrees or less with respect to the normal line), by using this etchant of the mixed acids and making the etchant penetrate into an interface between the resist (photoresist for mask) and the insulation film. This tapered shape is excellent in step covering properties of each film which is formed on the interlayer film, and is useful for stabilizing a production process and enhancing the yield.

Next, TaSiN is deposited as an exothermic resistor layer 103 to form a film with a thickness of approximately 200 to 1,000 Å, on the interlayer film 102, and also on an electrode 13 and an electrode 12 which exist on the upper parts of the emitter region and the base/collector region, through the through hole TH in order to produce electrical connection.

Next, an AL2 layer with a thickness of approximately 5,000 Å is deposited on the exothermic resistor layer 103, as a pair of wiring electrodes 104 of an electrothermal conversion element. Then, the AL2 layer and the TaSiN layer (exothermic resistor layer 103) are patterned, and the electrothermal conversion element and other wires are simultaneously formed (only in direction parallel to schematic sectional view illustrated in FIG. 3A).

Figure 3B:
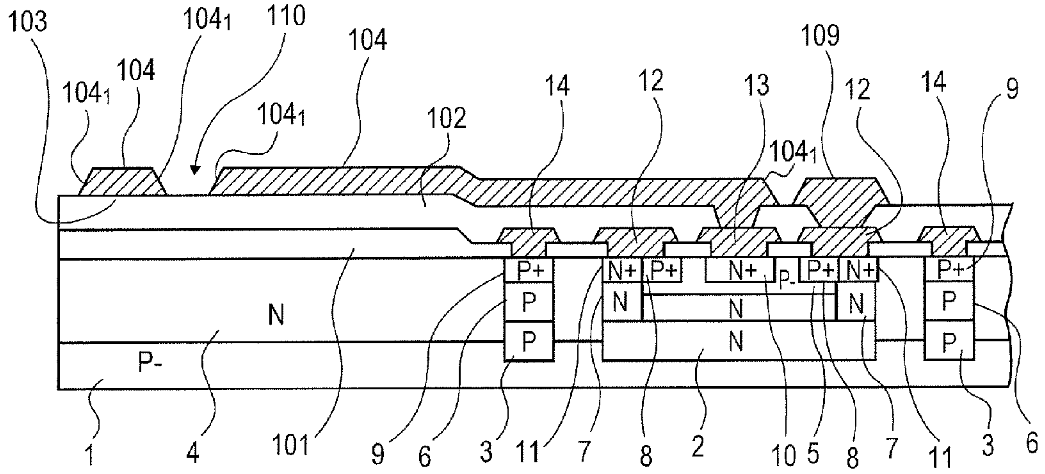

Next, in order to form a heat generating portion 110 (hereinafter referred to as heater) as is illustrated in FIG. 3B, a photoresist is applied onto the AL2 film to form a film with a thickness of 1.00±0.2 μm, the film is patterned, and then the AL2 film only on the heater layer is removed with wet etching. The portion from which the AL2 film has been removed can be formed into a tapered shape. The etched sectional shape of the removed portion can be tapered by using a mixture solution of nitric acid, hydrofluoric acid and acetic acid as an etchant, and making the etchant penetrate into an interface between the resist and the AL2 film, as has been described above.

After that, an SiN film 105 which functions as a metal protection layer 106 for the electrothermal conversion element and an insulation layer between Al wires are deposited so as to have a thickness of approximately 3,000 Å, with a PCVD method or the like. The protection film 105 may also be a film of SiO, SiN, SiON and SiC, or may also be a stacked film of the inorganic insulation films, in addition to the SiN film.

After that, Ta is deposited on the upper part of the heat generating portion of the electrothermal conversion element so as to form a film with a thickness of approximately 2,000 to 3,000 Å, as the metal protection layer 106 for producing cavitation resistance.

The Ta film 106 and the SiN film 105 are partially removed which have been formed in the above described way, and a pad (not-shown) for bonding is formed.

Figure 3C:
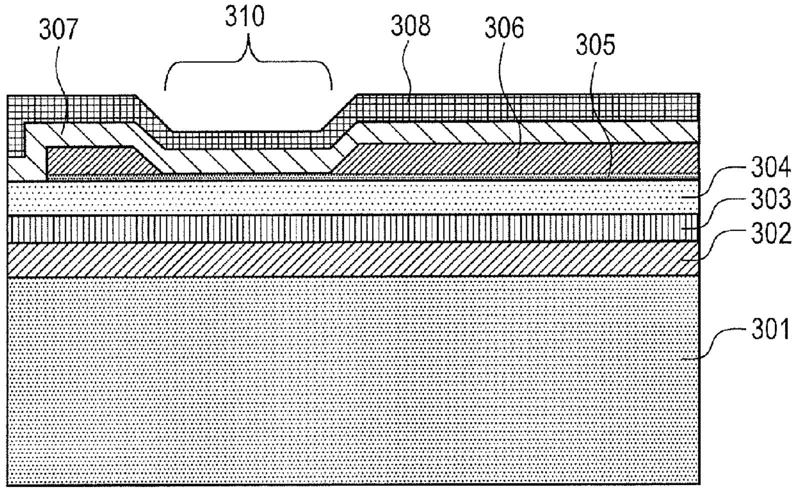

In addition, FIG. 3C illustrates a schematic sectional view of the substrate for the ink jet recording head, when the heater portion on the substrate is supposed to be longitudinally cut.

In FIG. 3C, main element portions including function elements are formed in a similar way to that in FIG. 3A. However, a second electric wiring layer (AL2 film) 305 is formed on a P—SiO film 304 which is an interlayer film, with a sputtering method, then the second electric wiring layer is vertically patterned in a parallel direction (while partially including a vertical direction) to the schematic sectional view of FIG. 3C, with a dry etching method, and only the heater portion 310 is patterned into a tapered shape with a dry etching method again. At this time, a mask resist is applied onto the AL2 film so as to form a layer with a thickness of 1.0±0.2 μm, then the mask resist is soft-baked, and adhesiveness between the mask resist layer and the AL2 film 305 under the mask resist layer is weakened. After that, the tapered shape of approximately 60 degrees is achieved with a technology of isotropic dry etching, in which an etching gas easily enters the vicinity of the interface between the above described mask resist and the AL2 film, and the retraction of the end face of the mask resist is promoted by the etching gas. Incidentally, when the film thickness of the mask resist is 1.3 μm or more, the shape of the resist after having been patterned also results in being tapered, and there is a case in which the end face is ruptured on the way when the mask resist is retracted by the etching gas, and the tapered shape of the AL2 film results in being distorted. For this reason, a heater material layer 306 is film-formed on the AL2 film 305 with a sputtering method, and the film can be patterned with a dry etching method.

After that, a P—SiN film 307 which is a protection film is film-formed with a PCVD method, and subsequently a Ta film 308 which is a cavitation resistant film is film-formed with a sputtering method.

The Ta film 308 and the P—SiN film 307 which have been formed in the above described way are partially removed, and a pad (not-shown) for bonding is formed.

Example 1

Figure 4:
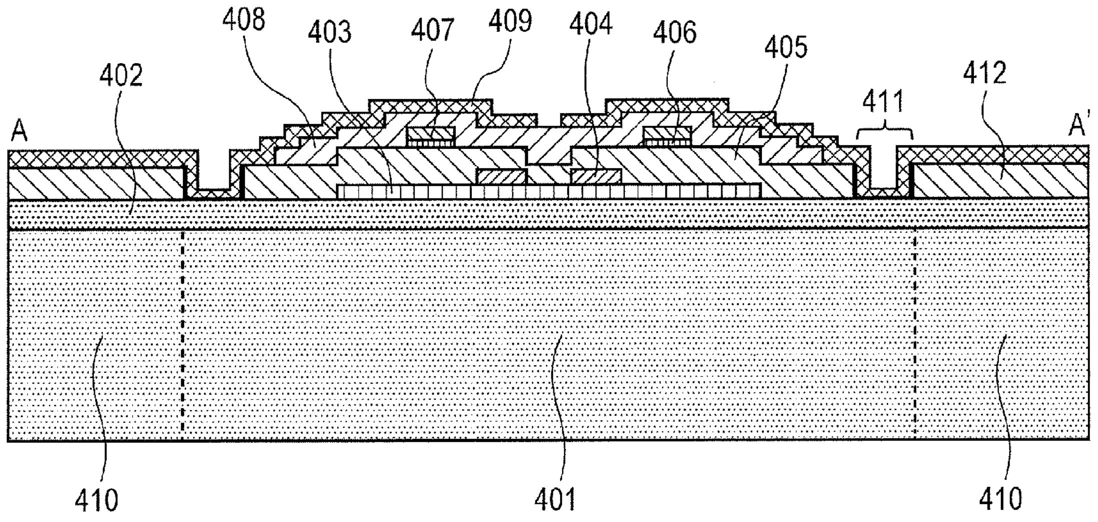
FIG. 4 is a schematic view of the substrate for the ink jet recording head which is described in Example 1 and illustrated in FIG. 2B, in a cross section taken along the dotted line A-A'.

FIG. 4 is a schematic sectional view of the substrate for the ink jet recording head, in a cross section taken along the dotted line A-A' illustrated in FIG. 2B.

The substrate for the ink jet recording head illustrated in FIG. 4 was produced in the following way.

First, a thermal oxide film 402 (Field-Ox film, hereinafter also referred to as FOx film) was formed on a silicon substrate 401 so as to have a thickness of 1.0 μm, at a temperature of 1,000° C. with a thermal diffusion step (LOCOS: Local Oxidation of Silicon step).

Next, a BPSG film (film of silicate glass containing boron and phosphorus) 403 was formed on the thermal oxide film 402 so as to have a thickness of 0.6 μm, with the use of a PCVD method.

Next, a first electric wiring layer 404 formed of an Al film was formed on the BPSG film 403, the thermal oxide film 402 and the silicon substrate 401 so as to have a thickness of 0.4 μm.

Next, an interlayer insulation film 405 using P—SiO was formed on the first electric wiring layer 404 and the thermal oxide film layer 402 so as to have a thickness of 1.0 μm, at a temperature of 200° C. with a plasma CVD method.

Next, the interlayer insulation film 405 was patterned so as to form a through hole portion (not-shown) for electrically connecting the first electric wiring layer 404 with a second electric wiring layer 407 (which will be described later), through the interlayer insulation film 405. At this time, a recessed portion (hereinafter referred to as side etching stopper arranging portion) for arranging a side etching stopper portion 411 therein was formed in the interlayer insulation film 405.

The side etching stopper arranging portion was provided by forming a recessed portion which surrounded a portion corresponding to a region in which an independent supply port is formed, out of the interlayer insulation film. The interlayer insulation film in the portion to be surrounded by the side etching stopper portion functions as a stopper layer in a dry etching process to be conducted when the independent supply port is formed, and accordingly is hereinafter referred to as an etching stop layer (412).

Next, a heater material layer (which is also referred to as exothermic resistor layer) 406 (with thickness of 0.05 μm) and a second electric wiring layer 407 formed of an AL film (with thickness of 0.6 μm) were formed on the interlayer insulation film 405. First, respective materials of the heater material layer 406 and the second electric wiring layer 407 were film-formed in serial order with the use of a sputtering method, and were patterned with a dry etching method. After that, the mask resist (with thickness of 1.2 μm) was applied and patterned in order to form a heater region. After that, the Al film was etched so as to be tapered with the use of a mixture solution of nitric acid, hydrofluoric acid and acetic acid.

In addition, when the Al film which would become the second electric wiring layer was arranged on the substrate, a material (tantalum nitride film) of the heater material layer and a material (Al film) of the second electric wiring layer were arranged also in the side etching stopper arranging portion. Then, the Al film was removed, and the tantalum nitride film was left in the side etching stopper arranging portion.

A metal which contains Ta as a main component can be used as the material of the heater material layer. The metal which contains Ta as a main component is not limited in particular, but includes, for instance, TaN, TaAl, TaSi and TaSiN. In addition to these metals, WSiN or the like may be used.

Next, a P—SiN film was formed on the second electric wiring layer 407 and the interlayer insulation film 405 as a protection film 408 so as to have a thickness of 0.3 μm, with a PCVD method. After that, the Ta film was formed on the protection film 408 as a cavitation resistant film 409 so as to have a thickness of 0.25 μm, with a sputtering method. After that, the cavitation resistant film 409 and the protection film 408 were partially removed, and a pad (not-shown) for bonding was formed.

In the substrate for the ink jet recording head of the present embodiment illustrated in the FIG. 4, the side etching stopper portion 411 is provided in the side face perimeter of the etching stop layer 412. For this reason, when the etching stop layer 412 is removed by isotropic etching, the side etching stopper portion 411 can suppress the side etching. In addition, in the present embodiment, the same material as the material of the heater material layer and the material of the cavitation resistant film is arranged in the side etching stopper portion. The side etching stopper portion is formed from the same material as that of the heater material layer or the cavitation resistant film, and thereby the side etching stopper portion can be provided simultaneously when the heater material layer or the cavitation resistant film is formed. Accordingly, in the present embodiment, it is preferable to form the side etching stopper portion by arranging at least one of the heater material layer and the cavitation resistant film, on the side etching stopper arranging portion which is formed of the recessed portion.

FIGS. 5A to 5G illustrate steps of producing an ink jet recording head with the use of the substrate for the ink jet recording head illustrated in FIG. 2B and FIG. 4.

Figure 5A:
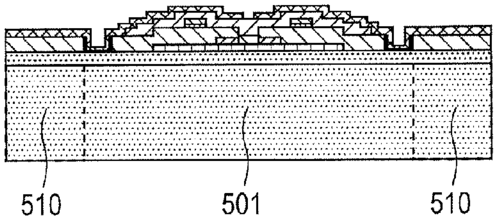
FIGS. 5A, 5B, 5C, 5D, 5E, 5F and 5G are schematic sectional views of steps for describing steps of producing the ink jet recording head described in Example 1.

FIG. 5A is the substrate for the ink jet recording head illustrated in FIG. 4.

Figure 5B:
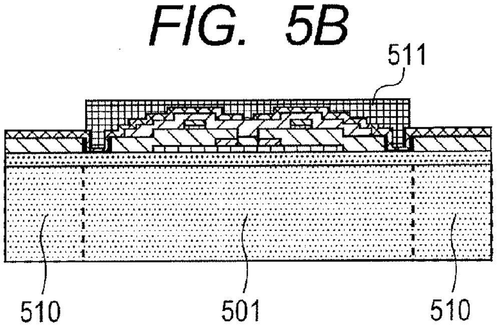

In FIG. 5B, HIMAL (made by Hitachi Chemical Company, Ltd.) is formed on the surface of the above described substrate for the ink jet recording head, as an adhesiveness enhancing layer 511 for enhancing adhesiveness between the substrate and a photosensitive coating resin layer 513 which will be described later, with a photolithographic process.

Figure 5C:
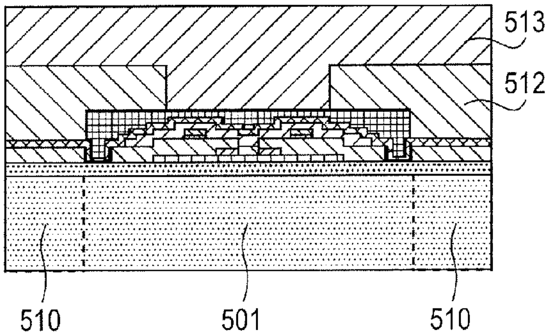

Subsequently, as is illustrated in FIG. 5C, a positive type resist layer containing PMIPK is formed as a mold pattern 512 which serves as a mold of an ink flow channel.

An application type resist which contains PMIPK as a main component is commercially available, for instance, in a product name of ODUR-1010 from TOKYO OHKA KOGYO CO., LTD. This coating film can be formed by a general spin coating method, and the pattern is formed by exposure and development of the resist film by an exposure device having an exposure wavelength of 230 to 350 nm.

Next, a material for a liquid flow channel structure is applied so as to cover the mold pattern 512, and the coating resin layer 513 is formed.

The material for the liquid flow channel structure is a photosensitive material which is described, for instance, in Japanese Patent No. 3143307 and contains an epoxy resin as a main component material. If the photosensitive material has been dissolved in an aromatic solvent such as xylene and has been applied onto the mold pattern, the solution can prevent the solution and PMIPK from dissolving into each other. Furthermore, the material for the liquid flow channel structure is subjected to exposure/development treatment, and constitutes the coating resin layer 513. It is preferable to use a negative type resist as the material for the liquid flow channel structure. In this case, a photomask (not-shown) is applied which inhibits a portion for the ejection port from being irradiated with the light. In addition, when a water-repellent coating film is formed on the coating resin layer 513, it is possible to provide the water-repellent coating film by forming a photosensitive water-repellent material layer, and exposing and developing the water-repellent material layer collectively together with the material for the liquid flow channel structure, as is described in Japanese Patent Application Laid-Open No. 2000-326515, for instance. At this time, the photosensitive water-repellent layer can be formed by lamination. After that, the material for the liquid flow channel structure and the photosensitive water-repellent layer are simultaneously exposed to light. A material having negative type characteristics is generally used as the material for the liquid flow channel structure, and accordingly the photomask is used (not-shown) which inhibits the portion for an ejection hole from being irradiated with light. An aromatic solvent such as xylene is preferably used for development.

Subsequently, a protection material (not-shown) such as a cyclized rubber was formed on the coating resin layer 513 so that the photosensitive coating resin layer 513 which would become a nozzle member might not receive a damage. Then, a common supply port was formed by the crystal anisotropy etching which was conducted from the side of a second face (rear face) of the semiconductor substrate 501. The common supply port was formed so as to have a depth of 70 to 90% of the thickness of the silicon wafer which constituted the substrate for the ink jet recording head, with the use of a strong alkaline etchant such as TMAH. Specifically, the common supply port was formed in the silicon substrate so as to become 500 μm deep out of the thickness of 625 μm of the silicon substrate, with the use of a TMAH solution.

Subsequently, a positive type photoresist was applied on the wall surface of the common ink supply port (not-shown) which had been formed on the rear face of the silicon substrate 501, so as to form a film having a thickness of 2 to 12 μm, with the use of a spray coater or the like. After that, the positive photoresist was exposed to light through a not-shown mask with the use of a rear face exposure device: UX-4258SC (made by USHIO INC.), subsequently was subjected to development treatment, and thereby a patterning mask for use in forming the independent supply port was formed on the bottom part of the common supply port.

Figure 5D:
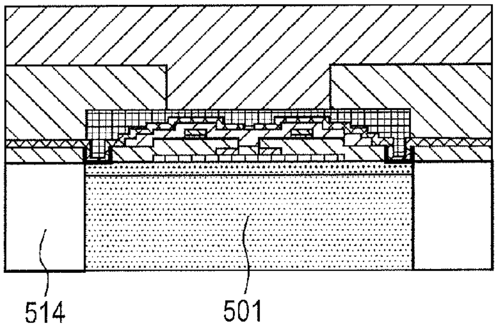

Subsequently, as is illustrated in FIG. 5D, a first aperture 514 having a depth of 125 μm and a size of an aperture of a square shape of 40×80 μm was formed by using a patterning mask and a silicon dry etching apparatus: Pegasus (made by Sumitomo Precision Products Co., Ltd.). The dry etching treatment for forming the first aperture 514 was conducted until the etched portion reached the etching stop layer 412. In addition, a reactive ion etching process with the use of a bosh process was used for the dry etching treatment.

In this dry etching process, the interlayer insulation film formed of a P—SiO film, which has been arranged on a region in which the independent supply port is formed, functions as the etching stop layer. In addition, when silicon was dry-etched by the bosh process, an $SF_6$-based gas and a CF-based ($C_4F_8$) gas were alternately used, and the first aperture 514 having a vertical shape was formed.

In addition, a water-repellent deposition film is deposited on the side wall of the first aperture 514 which has been formed by dry etching, due to the decomposition of a fluorine-based compound contained in the etching gas. Then, the side wall of the first aperture can be modified by immersing the silicon substrate 501 into an aqueous solution which contains a surfactant, has a viscosity of 1.2 to 5.0 cps and has a surface tension of 20 to 30 dyne/cm. An aqueous solution containing the surfactant can include, for instance, an aqueous solution that contains 300 ppm VersaTL-125 (made by Nippon NSC) which is a nonionic surfactant. In addition, suitable surfactants include hydrocarbon-based anionic surfactants, hydrocarbon-based nonionic surfactants, fluorine-based anionic surfactants and fluorine-based nonionic surfactants. Specifically, suitable hydrocarbon-based anionic surfactants include POLITY A-530 (made by Lion Corporation), VersaTL-125 (made by Nippon NSC), PIONIN A-40 (made by TAKEMOTO OIL & FAT Co., Ltd.) and PIONIN A-40-S (made by TAKEMOTO OIL & FAT Co., Ltd.). In addition, suitable hydrocarbon-based nonionic surfactants include NEWPOL PE-61 (made by Sanyo Chemical Industries Ltd.) and Adeka Pluronic L-64 (made by Asahi Denka Co., Ltd.). In addition, suitable fluorine-based anionic surfactants include Surflon S-141 (made by Seimi Chemical Co., Ltd.) and FT100C (made by NEOS COMPANY LIMITED). In addition, suitable fluorine-based nonionic surfactants include FT251 (made by NEOS COMPANY LIMITED) and EFTOP EF-351 (made by JEMCO Inc.). When the above described substrate for the ink jet recording head is immersed in the above described aqueous solution while an ultrasonic wave of 200 MHz or more is applied to the solution, the aqueous solution easily penetrates into the side wall of the first aperture 514, and the side wall can be modified.

Figure 5E:
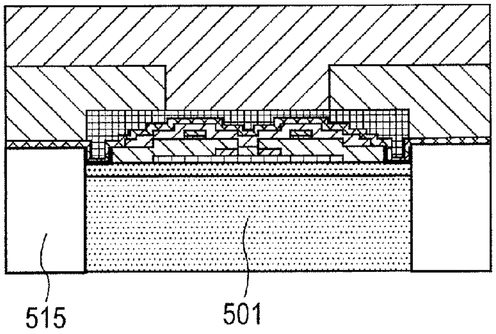

Next, as is illustrated in FIG. 5E, the independent supply port 515 was formed by removing the etching stop layer 412 which was exposed to the first aperture 514, by isotropic etching. Wet etching treatment was used as the isotropic etching, and an oxide film etchant was used in the wet etching treatment in the present example.

Specifically, the etching stop layer was removed by immersing the silicon substrate 501 in the oxide film etchant containing the surfactant, at normal temperature for 4 to 10 minutes. A BHF solution (LAL800: made by STELLACHEMIFA CORPORATION) was used as the oxide film etchant. The BHF solution is an oxide film etchant containing 1.0 to 10.0 mass % HF, 10 to 30 mass % $NH_4F$, and water. In addition, VersaTL-125 which is a non-ionic surfactant was used as the surfactant to be contained in the oxide film etchant with a concentration of 300 ppm.

Here, it is preferable to use an acidic aqueous solution which has a viscosity of 1.2 to 2.5 cps, a surface tension of 30.0 to 40.0 dynes/cm, a concentration of hydrofluoric acid (HF) of 1.0 to 10.0 mass %, and a concentration of ammonium fluoride ($NH_4F$) of 10.0 to 30.0 mass %, as the etching solution for the oxide film. In addition, the etching solution can adjust its viscosity and surface tension by containing a surfactant. Suitable surfactants which the oxide film etchant can contain include hydrocarbon-based anionic surfactants, hydrocarbon-based nonionic surfactants, fluorine-based anionic surfactants and fluorine-based nonionic surfactants. Specifically, suitable hydrocarbon-based anionic surfactants include POLITY A-530 (made by Lion Corporation), VersaTL-125 (made by Nippon NSC), PIONIN A-40 (made by TAKEMOTO OIL & FAT Co., Ltd.) and PIONIN A-40-S (made by TAKEMOTO OIL & FAT Co., Ltd.). In addition, suitable hydrocarbon-based nonionic surfactants include NEWPOL PE-61 (made by Sanyo Chemical Industries Ltd.) and Adeka Pluronic L-64 (made by Asahi Denka Co., Ltd.). In addition, suitable fluorine-based anionic surfactants include Surflon S-141 (made by Seimi Chemical Co., Ltd.) and FT100C (made by NEOS COMPANY LIMITED). In addition, suitable fluorine-based nonionic surfactants include FT251 (made by NEOS COMPANY LIMITED) and EFTOP EF-351 (made by JEMCO Inc.). When the viscosity and the surface tension become high, there is the case where the etchant resists penetrating into the etching stop layer 412 formed of the P—SiO film, from the rear face of the silicon substrate 501 through the independent supply port 515. In addition, when the content of $NH_4F$ in the etchant is increased to 30 mass % or more, a selection ratio (etching rate ratio) of the thermal oxide film (FOx film) 402 to the etching stop layer 412 formed of the P—SiO film becomes small, and when the etching stop layer 412 is removed, there is the case where a part of the thermal oxide film 402 results in being removed. In addition, when the content of $NH_4F$ in the etchant is increased to 30 mass % or more, the viscosity of the BHF solution becomes 3.0 cps or more, and there is the case where the etchant resists penetrating into the inside of the fine independent supply port 515. Then, in the present example, the etching stop layer 412 formed of the P—SiO film was removed with the use of LAL800 (that is product name and is made by STELLACHEMIFA CORPORATION) which contains 4.0 mass % HF, 20 mass % $NH_4F$, 0.01 mass % of a surfactant, and 75.99 mass % water. At this time, etching rates of LAL800 for solid films of the etching stop layer 412 formed of the P—SiO film and the thermal oxide film 402 were 0.2 μm/min and 0.08 μm/min, respectively. Specifically, the etching rate ratio for the solid films is 1:2.5 (etching stop layer: thermal oxide film).

Incidentally, when the tip part of the independent supply port is fine, it is necessary to consider an area ratio of films (for instance, etching stop layer 412 formed of P—SiO film and thermal oxide film (FOx film) 402) with which LAL800 of the etchant directly comes in contact. Specifically, an area on which the P—SiO film comes in contact with LAL800 is an area of an aperture of the above described independent supply port=40 μm×80 μm=3,200 μm². On the other hand, an area on which the thermal oxide film (FOx film) 402 comes in contact with LAL800 is [a thickness of 1.0 μm]×[an inner peripheral length (40×2+80×2)]=240 μm². Specifically, a substantial etching rate ratio of the interlayer insulation film 405 formed of the P—SiO film to the thermally-oxidized film thermal oxide film (FOx film) 402 by LAL800 is 1:40 or more. As a result of this, a shape effect was substantially added, and the thermal oxide film (FOx film) 402 was not removed (not performing side etching) by a thickness of 0.025 μm (25 nm) or more, on the tip part of the fine independent supply port as illustrated in FIG. 5E, even when the etching period of time was somewhat extended. In addition, the heater material layer (exothermic resistor layer) and a cavitation resistant film formed from Ta which constitute the side etching stopper portion 411 in the present example have an etching rate ratio by LAL800 of 1:100 (or more, by solid film ratio) with respect to the interlayer insulation film 405 which is formed of the P—SiO film. Accordingly, the side etching stopper portion 411 was not removed (not performing side etching) by a thickness of 0.01 μm (10 nm) or more. Furthermore, crystalline silicon (crystal orientation of <100>) which forms the silicon substrate 501 also has an etching rate ratio by LAL800 of approximately 1:100 (or less, by solid film ratio) with respect to the interlayer insulation film 405 which is formed of the P—SiO film, and accordingly a change of 0.01 μm (10 nm) or more has not occurred.

Figure 5F:
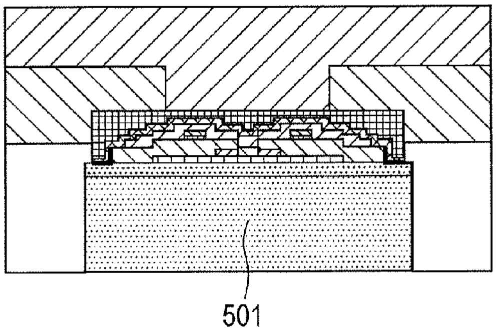

Next, as is illustrated in FIG. 5F, the cavitation resistant film 409 which was exposed to the independent supply port 515 was removed by an isotropic dry etching process with the use of a CF-based ($CF_4$) gas and an oxygen-based gas, from the rear face of the silicon substrate 501 through the independent supply port 515. At this time, a part of the heater material and Ta which constitute the side etching stopper portion was also removed.

The side etching stopper portion is exposed as in the present example, and thereby the side etching stopper can specify the dimension of an aperture in the side of the first face of the independent supply port 515 with high accuracy.

Figure 5G:
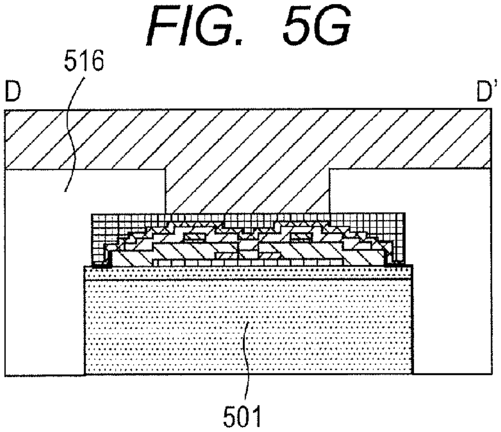

Next, as is illustrated in FIG. 5G, the mold pattern 512 was irradiated with Deep UV light through the coating resin layer 513 to be decomposed, the decomposed mold pattern was dissolved out by a solvent, and an ink flow channel 516 was formed.

The mold pattern can be easily dissolved out by immersing the substrate in the solvent or spraying the solvent to the substrate with a spray. In addition, if an ultrasonic wave or the like has been used in combination, a dissolving period of time can be further shortened. After that, the coating resin layer 513 was heated at 200° C. for 1 hour in order to further cure the coating resin layer.

FIG. 5G is a schematic sectional view corresponding to a cross section taken along the dotted line D-D' in a perspective view of the ink jet recording head illustrated in FIG. 2A.

Figure 8:
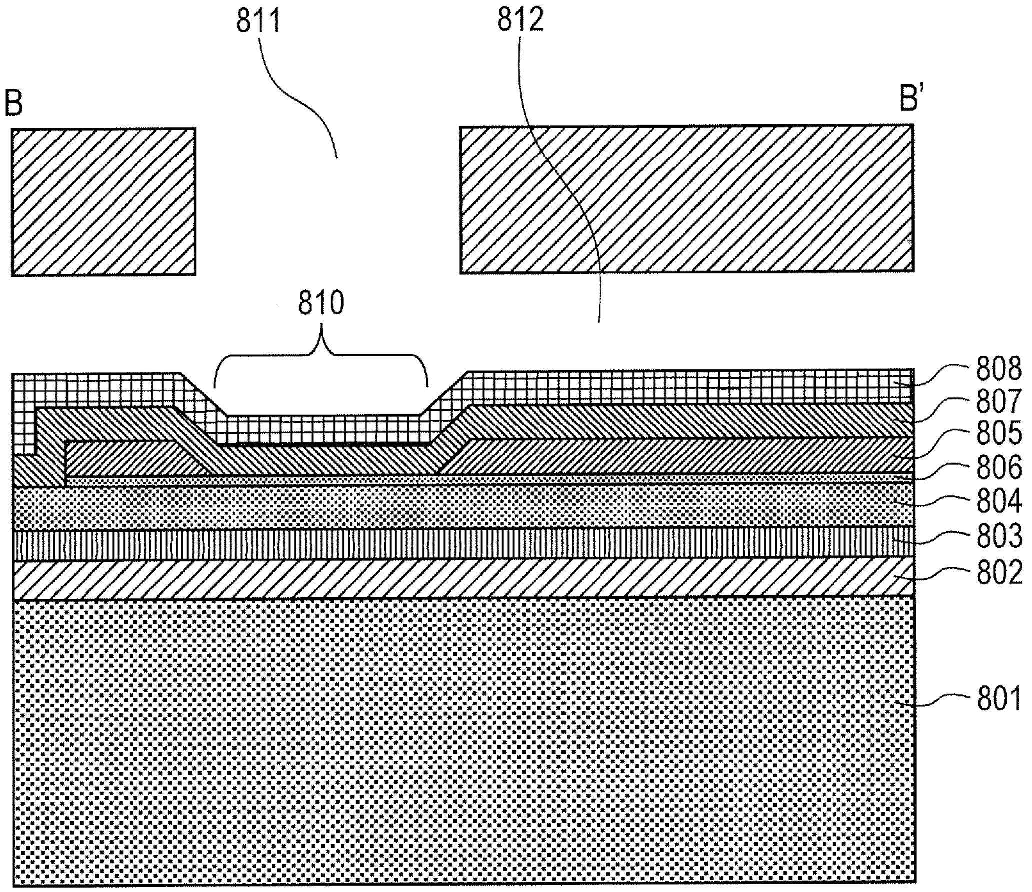
FIG. 8 is a schematic view of the ink jet recording head which is described in Example 1 and illustrated in FIG. 2A, in a cross section taken along the dotted line B-B'.

FIG. 8 is a schematic sectional view corresponding to a cross section taken along the dotted line B-B' illustrated in FIG. 2A, of the ink jet recording head which has been produced according to production steps illustrated in FIGS. 5A to 5G. In FIG. 8, a resin substrate which is arranged on the ink jet recording head disclosed in FIGS. 5A to 5G is arranged on the schematic view of the cross section appearing when the heater portion on the substrate for the ink jet recording head illustrated in FIG. 3C is supposed to be longitudinally cut. The resin substrate constitutes an ink flow channel 812 and an ejection port 811. In the ink jet recording head illustrated in FIG. 8, the air bubble which has been generated in the heater portion 810 can make an ink drop fly through the ink ejection port 811. After the ink drop has flown from the ejection port 811, the ink flow channel 812 including the upper part of the heater portion 810 is refilled with ink from both sides. In addition, the ink flow channel 812 is arranged symmetrically with respect to the heater portion 810 which is supposed to be a center, and thereby the heater portion 810 is refilled with the ink at a high speed. Accordingly, the speed of a cycle of the air bubble generated in the heater portion 810 can be increased, and the ink drop can fly at high speed. Furthermore, the air bubble which has been generated in the heater portion 810 also symmetrically spreads. Accordingly, the ink drop which flies from the ejection port 811 also results in being ejected in a direction perpendicular to the heater portion 810, and the ink drop can be landed onto a medium to be recorded thereon, with high accuracy.

Figure 9:
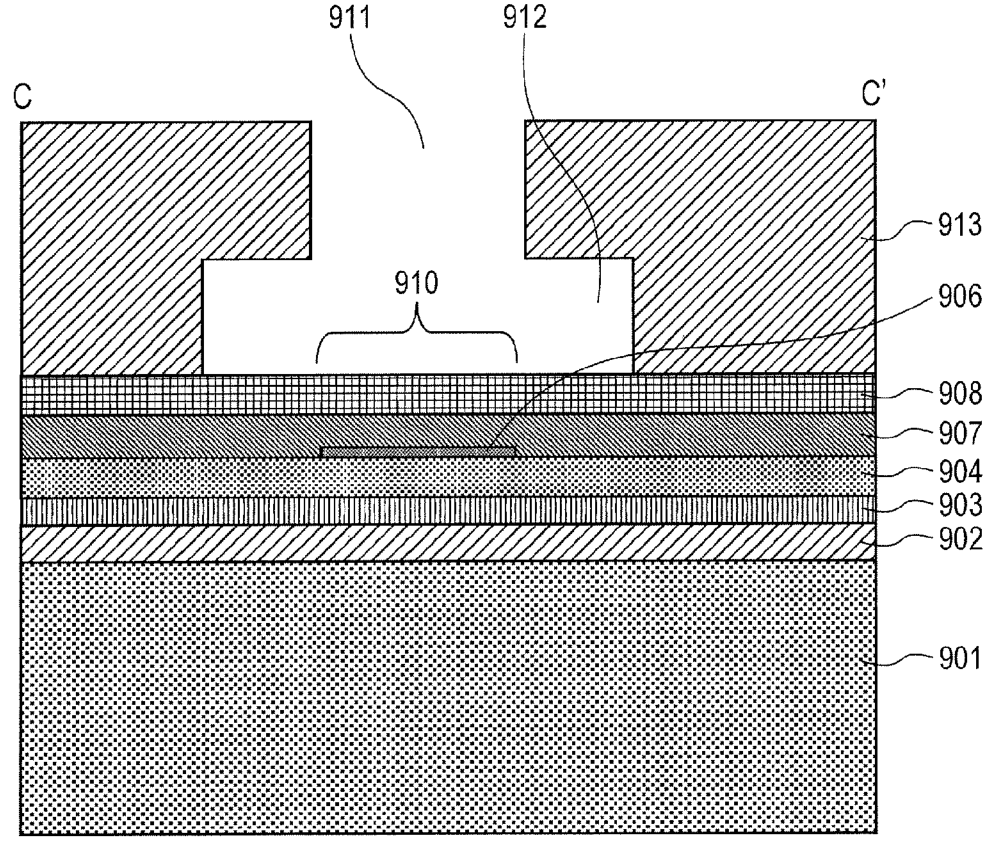
FIG. 9 is a schematic view of the ink jet recording head which is described in Example 1 and illustrated in FIG. 2A, in a cross section taken along the dotted line C-C'.

In addition, FIG. 9 is a schematic sectional view in a cross section taken along the dotted line C-C' disclosed in FIG. 2A, of the ink jet recording head which has been produced according to production steps illustrated in FIGS. 5A to 5G. In FIG. 9, a resin substrate which has been arranged on the ink jet recording head disclosed in FIGS. 5A to 5G is formed on the schematic view of the cross section appearing when the heater portion on the substrate for the ink jet recording head illustrated in FIG. 3C is supposed to be longitudinally cut. The resin substrate constitutes an ejection port 911 and an ink flow channel 912, and has a nozzle wall 913 which reduces interference between an air bubble that is generated in the heater portion 910 and an air bubble that is generated in an adjacent heater.

Figure 12:
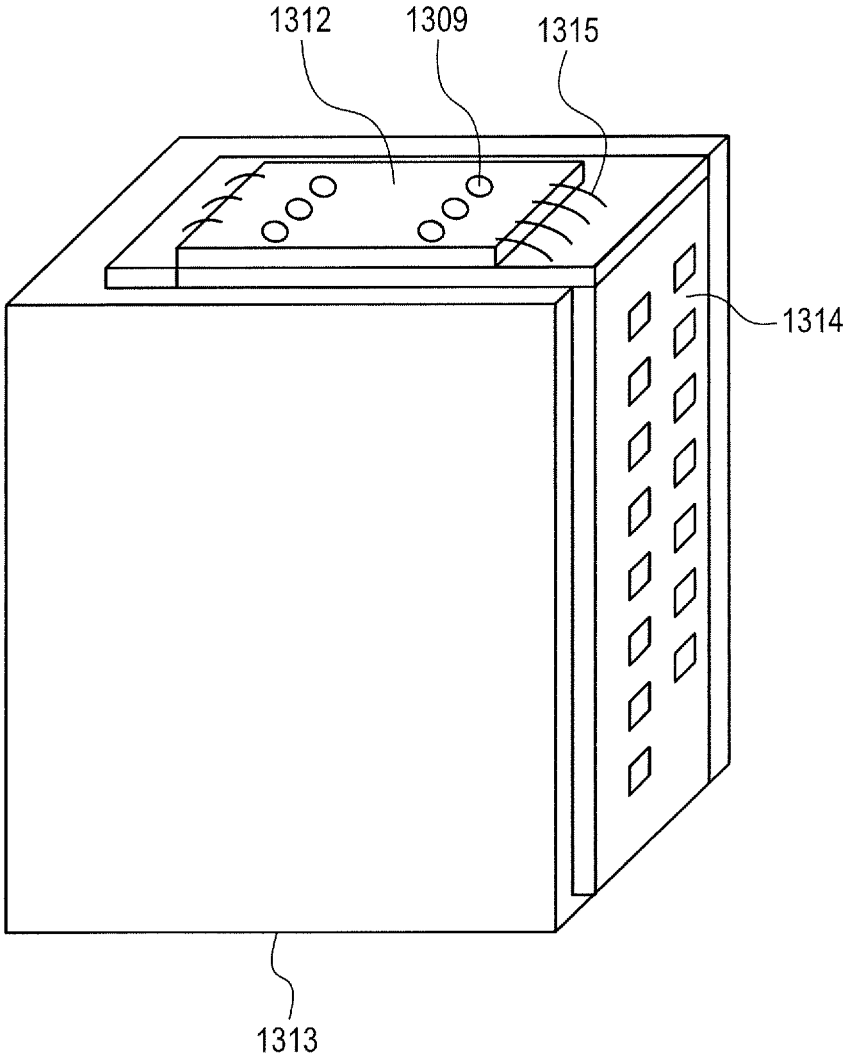
FIG. 12 is a schematic view illustrating a configuration of an ink jet head unit on which an ink jet recording head is mounted.

The produced ink jet recording head was mounted on the ink jet head unit having the form illustrated in FIG. 12, ink was ejected therefrom, and a recording performance was evaluated. As a result, an adequate image could be recorded. As for the form of the ink jet head unit, a TAB film 1314 for receiving a recording signal from the main body of the recording apparatus is provided, for instance, on the outer face of a holding member which removably holds an ink tank 1313, as is illustrated in FIG. 12. In addition, an ink jet recording head 1312 is connected to electrical wires by leads 1315 for electrical connection, on the TAB film 1314.

Accordingly, the method for producing the liquid ejecting head according to the present embodiment can control the dimension of the aperture in the first face side of the independent supply port, with high accuracy. As a result, the method can form a distance between the ejection energy generating element and the independent supply port, with high accuracy. Accordingly, the method can produce a liquid ejecting head excellent in an ejection speed, landing accuracy and an ink refilling speed.

In addition, the liquid ejecting head which is obtained by the production method according to the present embodiment has the following configuration.

Specifically, the liquid ejecting head according to the present embodiment is a liquid ejecting head including a substrate which has an ejection energy generating element that generates energy for ejecting a liquid, on its first face, and an independent supply port that reaches the first face from a side of a second face which is a face in the opposite side to the first face, and a resin substrate which constitutes an ejection port that ejects the liquid and a liquid flow channel in communication with the ejection port and the independent supply port, and is provided on the first face of the substrate, wherein an upper end portion on the first face side out of the inner wall of the independent supply port is formed of a metal protection film.

In other words, an inner perimeter portion of a portion in communication with the liquid flow channel out of the independent supply port is formed of the metal protection film.

The liquid ejecting head according to the present embodiment can prevent the corrosion of electric wires by the ink from occurring from the vicinity of the aperture on the first face side of the independent supply port, and accordingly is excellent in reliability also of durability when the ink is continuously ejected.

The metal protection film is preferably formed of a metal which contains Ta as a main component. Alternatively, a metal film of α-Ta, Ir or the like may be used. In addition, the metal protection film is preferably formed from the same material as that of an exothermic resistor which constitutes the ejection energy generating element or that of the above described cavitation resistant film which is formed on the ejection energy generating element. By having this configuration, the metal protection film becomes preferable not only from the viewpoint of preventing corrosion but also from the viewpoint of the cost, because the production steps also can be facilitated.

Figure 7:
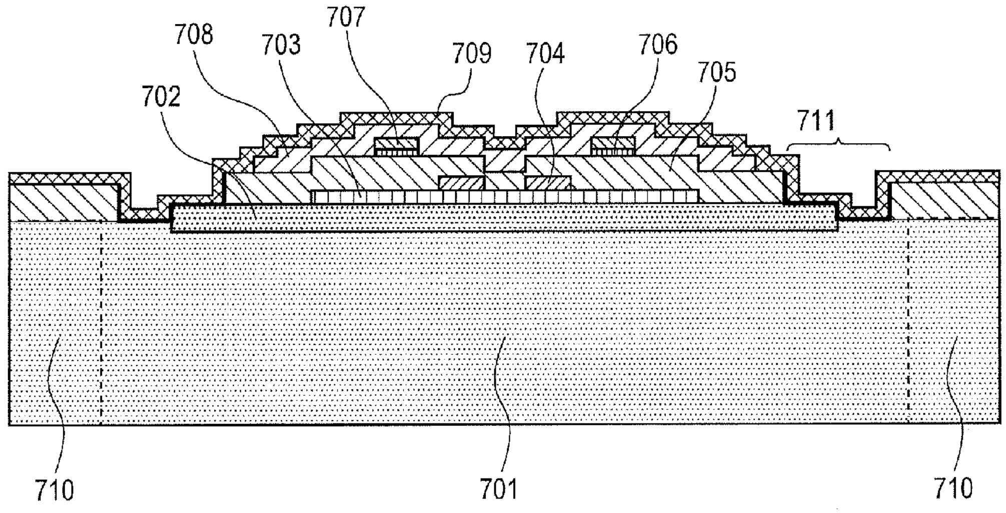
FIG. 7 is a schematic sectional view of a substrate for an ink jet recording head described in Example 3.

In addition, a further desirable form is a form in which the metal protection film contacts the silicon substrate, as is illustrated in FIG. 7. In FIG. 7, after the etching stop layer has been removed, the metal protection film (side etching stopper portion) is exposed, but a portion which comes in contact with the ink is formed of the silicon substrate and the metal protection film, and accordingly the liquid ejecting head results in having excellent durability.

Example 2

Figure 6:
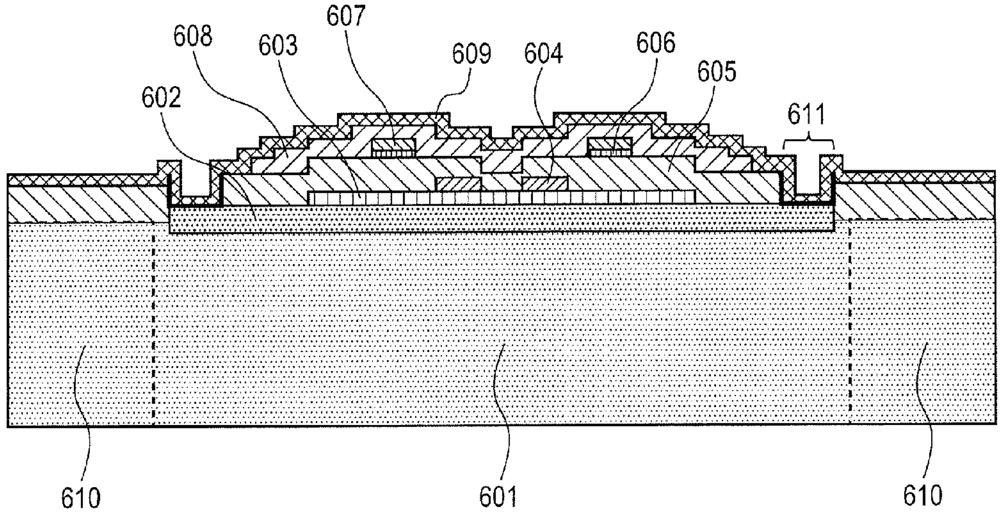
FIG. 6 is a schematic sectional view of a substrate for an ink jet recording head described in Example 2.

As is disclosed in the steps of producing the ink jet recording head according to the present embodiment in FIGS. 5A to 5G, an independent supply port is formed by dry etching of silicon, after a patterning mask has been formed in a recessed portion (common supply port) which has been formed on the rear face of a silicon substrate. It is known that the formation accuracy of the patterning mask in the recessed portion which has been formed on the rear face of the silicon substrate, and the processing accuracy of the dry etching of silicon in the bottom surface of the recessed portion are slightly inferior compared to the accuracy of processing on the surface of the silicon substrate. Then, FIG. 6 illustrates a schematic sectional view of the substrate for the ink jet recording head, in a cross section taken along the dotted line A-A' illustrated in FIG. 2B, in which the accuracy on the rear face of the silicon substrate is assumed to occasionally deviate by several μm. In the present example, as is illustrated in FIG. 6, a region 610 in which an independent supply port is scheduled to be formed and a side etching stopper are each arranged so as to have a distance from each other in a plane direction. Thereby, even when the position of the aperture on the first face side of the independent supply port has slightly deviated, an etched portion by dry etching reaches an etching stop layer. An ink jet recording head was produced through steps of producing the ink jet recording head similar to those in FIGS. 5A to 5G, concerning the other steps.

Example 3

Similarly to that in Example 2, in order to achieve the present invention, FIG. 7 illustrates a schematic sectional view of the substrate for the ink jet recording head, in a cross section taken along the dotted line A-A' illustrated in FIG. 2B, in which the accuracy on the rear face of the silicon substrate is assumed to occasionally deviate by several μm. In FIG. 7, a side etching stopper portion 711 is arranged on a thermal oxide film 702 and a silicon substrate 701, and a part of the side etching stopper portion 711 contacts the silicon substrate 701. In other words, the ink jet recording head is structured so that the side etching stopper portion 711 is arranged between the thermal oxide film 702 and the etching stop layer. In addition, the etching stop layer and the side etching stopper portion are arranged on the first face of the silicon substrate 710, and the side face of the etching stop layer contacts the side face of the side etching stopper portion. By having such a configuration, the side etching stopper portion can more effectively suppress the side etching when the etching stop layer is removed. An ink jet recording head was produced through steps of producing the ink jet recording head similar to those in FIGS. 5A to 5G, concerning the other steps.

Example 4

Figure 13:
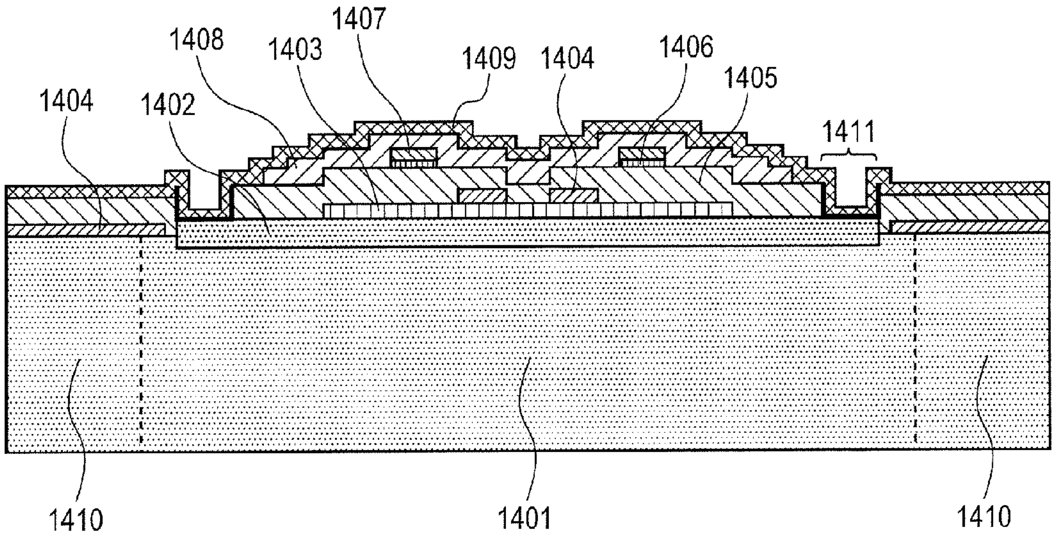
FIG. 13 is a schematic sectional view of a substrate for an ink jet recording head described in Example 4.

FIG. 13 is a schematic sectional view of the substrate for the ink jet recording head, in a cross section taken along the dotted line A-A' illustrated in the FIG. 2B, in which the accuracy on the rear face of the silicon substrate is assumed to occasionally deviate by several μm. In FIG. 13, a first electric wiring layer 1404 and an interlayer insulation film 1405 were arranged as an etching stop layer in the dry etching of silicon, which is conducted when an independent supply port is formed in a region 1410 in which an independent supply port was scheduled to be formed, from the rear face of a silicon substrate 1401. Thereby, when the independent supply port is processed by the dry etching of silicon, an end point can be detected with high accuracy. In addition, thereby, an in-plane distribution of a plurality of the above described substrates for the ink jet recording head arranged in a silicon wafer is also enhanced, the yield can also be enhanced, and the ink jet recording head can be inexpensively formed. Furthermore, a horizontally spreading phenomenon (which is usually referred to as "notch") which occurs almost in the end point of the dry etching of silicon can be also suppressed, and an independent supply port can be formed with further higher accuracy.

The method for producing the ink jet recording head of the present invention with the use of the substrate for the ink jet recording head disclosed in FIG. 13 can produce an ink jet recording head through the steps of producing the ink jet recording head similar to those in FIGS. 5A to 5G.

However, the first electric wiring layer was removed by immersing the substrate 1401 for the ink jet recording head, into an aluminum etchant: NS-30 (aqueous mixture solution of phosphoric acid and nitric acid, made by Hayashi Pure Chemical Ind., Ltd.), which had been heated to 50° C., for 10 to 30 minutes. In addition, the aluminum etchant: NS-30 does not have an action of dissolving silicon and an inorganic insulation film containing silicon, and accordingly did not damage component materials other than the AL1 film.

The ink jet recording head was produced by the method of producing the ink jet recording head disclosed in FIGS. 5D to 5G, concerning the subsequent production steps.

Example 5

Figure 14:
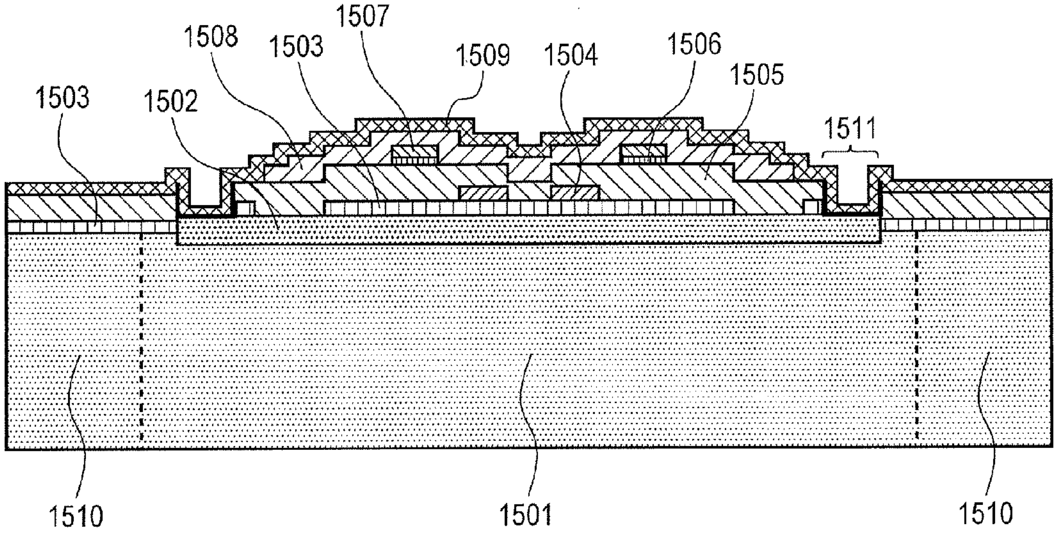
FIG. 14 is a schematic sectional view of a substrate for an ink jet recording head described in Example 5.

FIG. 14 is a schematic sectional view of the substrate for the ink jet recording head according to the present example, in a cross section taken along the dotted line A-A' illustrated in the FIG. 2B.

FIG. 14 illustrates an embodiment in which a side etching stopper 1511 is more stably produced by dry etching of an interlayer insulation film 1505 that is formed of a P—SiO film, when the substrate for the ink jet recording head is produced which is shown in Example 1 and is disclosed in FIG. 4.

A substrate for the ink jet recording head having the side etching stopper portion 1511 is produced which functions when the interlayer insulation film 1505 formed of a P—SiO film is removed, in a similar way to that in Example 1.

A BPSG (silicate glass containing boron and phosphorus) film 1503 which has been formed with a PCVD method is arranged on a thermal oxide film (FOx film) 1502 that has been formed at 1,000° C., when a side etching stopper arranging portion is formed by dry etching of the interlayer insulation film 1505 formed of the P—SiO film. The side etching stopper portion 1505 which contacts the FOx film 1502 can be stably formed by arranging the BPSG film 1503 thereon. Furthermore, the BPSG film can be arranged also on a region 1510 in which an independent supply port is scheduled to be formed. Accordingly, the silicate glass film 1503 can serve as an etching stop layer when the independent supply port is formed by the dry etching of silicon.

In addition, the BPSG film 1503 is easily dissolved also in a BHF solution (LAL800, made by STELLACHEMIFA CORPORATION) to which a surfactant is added, and accordingly a removing step was also easy.

The ink jet recording head was produced by the same step flow as that in Example 1, by using the substrate for the ink jet recording head disclosed in FIG. 14.

Comparative Example 1

Figure 10:
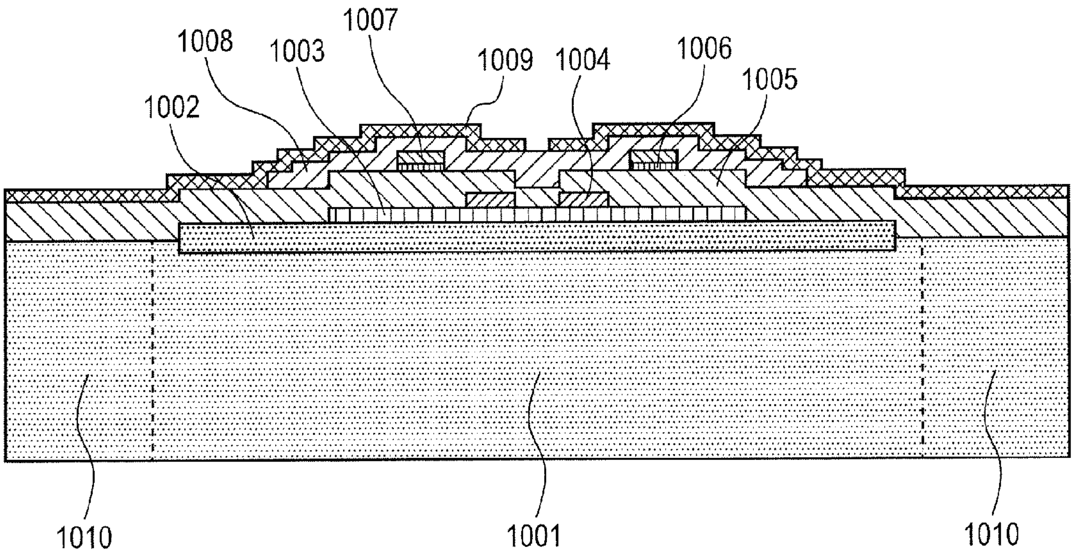
FIG. 10 is a schematic sectional view of a substrate for an ink jet recording head described in Comparative Example 1.

Next, FIG. 10 illustrates a substrate for an ink jet recording head, which is different from that in FIG. 4 and does not have a side etching stopper portion in the perimeter of the aperture of the independent supply port, as Comparative Example 1.

In FIG. 10, a thermal oxide film 1002 (Field-Ox film, hereinafter referred to as FOx film) having a thickness of 1.0 μm was formed on a silicon substrate 1001 at a temperature of 1,000° C., with a thermal diffusion step (LOCOS: Local oxidation of silicon step). After that, a BPSG (silicate glass containing boron and phosphorus) film 1003 was formed on the thermal oxide film with a PCVD method, so as to have a thickness of 0.6 μm. A first electric wiring layer (hereinafter also referred to as AL1 film) 1004 was formed on the BPSG film 1003, the FOx film 1002 and the silicon substrate 1001, so as to have a thickness of 0.4 μm. An interlayer insulation film 1005 formed of a P—SiO film was formed on the AL1 layer 1004 at a temperature of 200° C. with a plasma CVD method, so as to have a thickness of 1.0 μm. Next, the interlayer insulation film 1005 was patterned so as to form a through hole portion (not-shown) for electrically connecting the first electric wiring layer with a second electric wiring layer through the interlayer insulation film 1005. Next, an exothermic resistor layer 1006 which was a heater material layer and the second electric wiring layer (which is also referred to as AL2 film) 1007 were formed on the interlayer insulation film 1005 with a sputtering method, so as to have thicknesses of 0.05 μm and 0.6 μm, respectively. As described above, first, a material of the heater material layer and a material (Al film) of the AL2 film were patterned by a dry etching method. After that, in order to form a heater region, a mask resist was applied onto the AL2 film so as to have a thickness of 1.2 μm, and the film was patterned. After that, only the AL2 film was etched so as to be tapered with the use of a mixture solution of nitric acid, hydrofluoric acid and acetic acid. After that, a P—SiN film was formed with a PCVD method so as to have a thickness of 0.3 μm, and was patterned. Thereby, a protection film 1008 was formed. After that, a cavitation resistant film 1009 was formed on the protection film 1008. The cavitation resistant film 1009 was formed of a Ta film which was film-formed with a sputtering method so as to have a thickness of 0.25 μm. After that, the cavitation resistant film 1009 and the protection film 1008 were partially removed, and a pad (not-shown) for bonding was formed.

FIGS. 11A to 11G illustrate steps for producing the ink jet recording head according to Comparative Example 1.

Figure 11A:
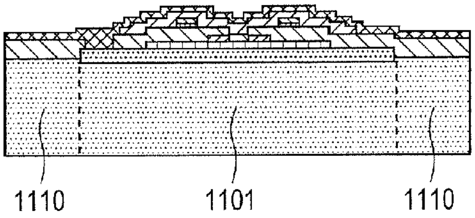
FIGS. 11A, 11B, 11C, 11D, 11E, 11F and 11G are schematic sectional views of steps for describing steps of producing the ink jet recording head described in Comparative Example 1.

FIG. 11A is a substrate for an ink jet recording head illustrated in FIG. 10.

Figure 11B:
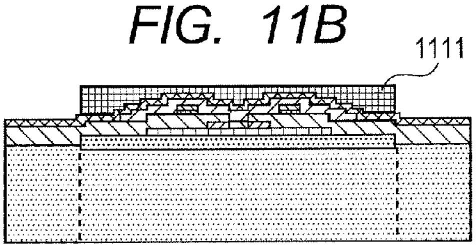

In FIG. 11B, an adhesiveness enhancing layer 1111 for enhancing adhesiveness between the substrate and a photosensitive coating resin layer 1113 which will be described later is formed on the surface of the substrate for the ink jet recording head.

HIMAL (made by Hitachi Chemical Company, Ltd.) was used as the adhesiveness enhancing layer 1111.

Figure 11C:
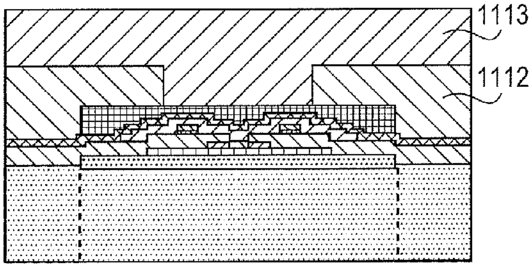
Figure 11D:
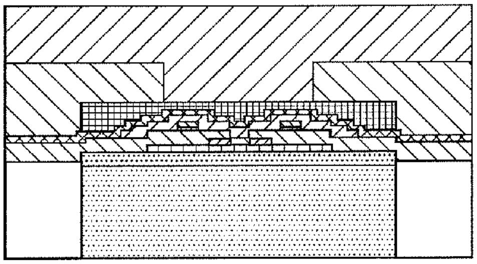

Subsequently, as is illustrated in FIG. 11C, a mold pattern 1112 was formed with the use of a positive type resist containing PMIPK.

Next, a material for a liquid flow channel structure was applied so as to cover the mold pattern 1112 formed of a positive type resist, was subjected to exposure and development treatments, and a coating resin layer 1113 having an ejection port was formed.

Subsequently, a face in the side of the silicon substrate, on which the nozzle had been formed, was protected by a protective material (not-shown) such as a cyclized rubber so that the coating resin layer 1113 was not damaged. Then, a common supply port was formed by the crystal anisotropy etching which was conducted from a second face (rear face) of the silicon substrate. The common supply port was formed so as to have a depth of 70 to 90% of the thickness of the silicon wafer which constituted the substrate for the ink jet recording head, with the use of a strong alkaline etchant such as TMAH. Specifically, the common supply port was formed in the silicon substrate so as to be 500 μm deep out of the thickness of 625 μm of the silicon substrate, with the use of the above described TMAH solution.

Subsequently, a positive type photoresist was applied on the wall surface of the common supply port (not-shown) which had been formed on the rear face of the silicon substrate, so as to form a film having a thickness of 2 to 12 μm, with the use of a spray coater or the like. After that, the positive photoresist was exposed to light with the use of a rear face exposure device: UX-4258SC (made by USHIO INC.), an exposure pattern was formed, subsequently the positive photoresist was subjected to development treatment, and thereby a patterning mask for use in forming an independent supply port was formed on the bottom surface of the common supply port.

Subsequently, an independent supply port having a thickness of 125 μm and a size of an aperture of a square shape of 40 μm×80 μm was formed in a region 1110 in which an independent supply port was scheduled to be formed, with the use of a silicon dry etching apparatus: Pegasus (made by Sumitomo Precision Products Co., Ltd.) that adopted a bosh process, while the above described photoresist was used as a mask. An interlayer insulation film (P—SiO film) 405 which has been arranged on the above described region in which the independent supply port is scheduled to be formed functions as an etching stop layer, in the above described step of the dry etching of silicon. Furthermore, when silicon was dry-etched by the bosh process, a $SF_6$-based gas and a CF-based ($C_4F_8$) gas were alternately used, and the independent supply port having a vertical shape was formed.

Next, the side wall of the independent supply port was modified in a similar way to that in Example 1, and then the etching stop layer was removed by isotropic etching with the use of an oxide film etchant.

Figure 11E:
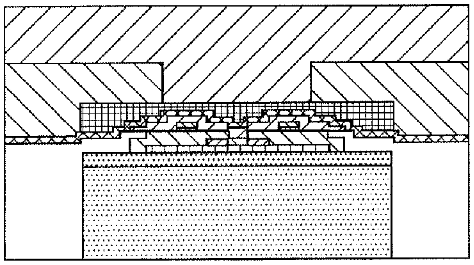

The same etchant as that in Example 1 was used as the etchant. However, when the etching stop layer formed of the P—SiO film was removed, an etching period of time was extended so as not to leave a removal residue. Then, the side etching resulted in having progressed as illustrated in FIG. 11E. In addition, it occurred in some cases that not only the interlayer insulation film 1105 but also the protection film 1008 formed of the P—SiN film on the second electric wiring layer (AL2 film) 1007 were removed. This is because the side etching stopper portion was not formed and accordingly the side etching has progressed when the etching stop layer was removed. Furthermore, it is also included as a factor that a surfactant was added to an ordinary BHF solution to lower the surface tension, in order to facilitate the solution to penetrate into the inside of the fine independent supply port. Specifically, it has been a factor that the solution has been facilitated to penetrate also into an interface between the FOx film 1002 and the interlayer insulation film 1005 and an interface between the interlayer insulation film 1005 and the cavitation resistant film 1009, as a result of having lowered the surface tension, and that the side etching has rapidly progressed. When the BHF solution was used as a removing liquid, which contained a surfactant having low viscosity and low surface tension, in particular, the side etching remarkably occurred. In addition, when this side etching has progressed, even the second electric wiring layer (AL2 film) 1007 is also dissolved in some cases.

Figure 11F:
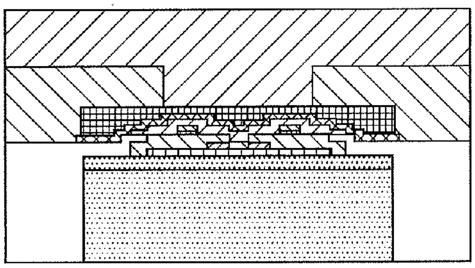

Next, the cavitation resistant film which was exposed to the independent supply port was removed by an isotropic dry etching process with the use of the CF-based ($CF_4$) gas and the oxygen-based gas, from the rear face of the silicon substrate 1101 through the independent supply port, as is illustrated in FIG. 11F. Incidentally, the cavity formed by the progress of the side etching into the interlayer insulation film 1005 illustrated in FIG. 11E has remained intact.

Figure 11G:
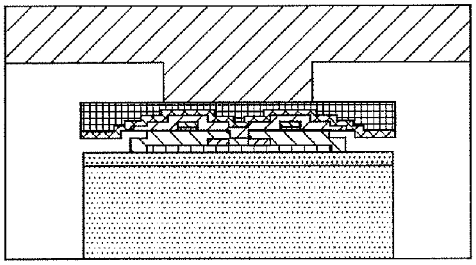

Next, as is illustrated in FIG. 11G, the whole surface was irradiated with Deep UV light through the coating resin layer 1113, and then a mold pattern 1112 was dissolved out. After that, the coating resin layer 1113 was heated at 200° C. for 1 hour in order to further cure the coating resin layer.

After that, the produced ink jet recording head was mounted on the ink jet head unit having the form illustrated in FIG. 12, ink was ejected therefrom, and a recording performance was evaluated, in a similar way to that in Example 1. As a result, there was a case where the ink penetrated into the above described cavity formed by the progress of the side etching of the interlayer insulation film and ultimately caused an electrical short circuit.

Figure 15:
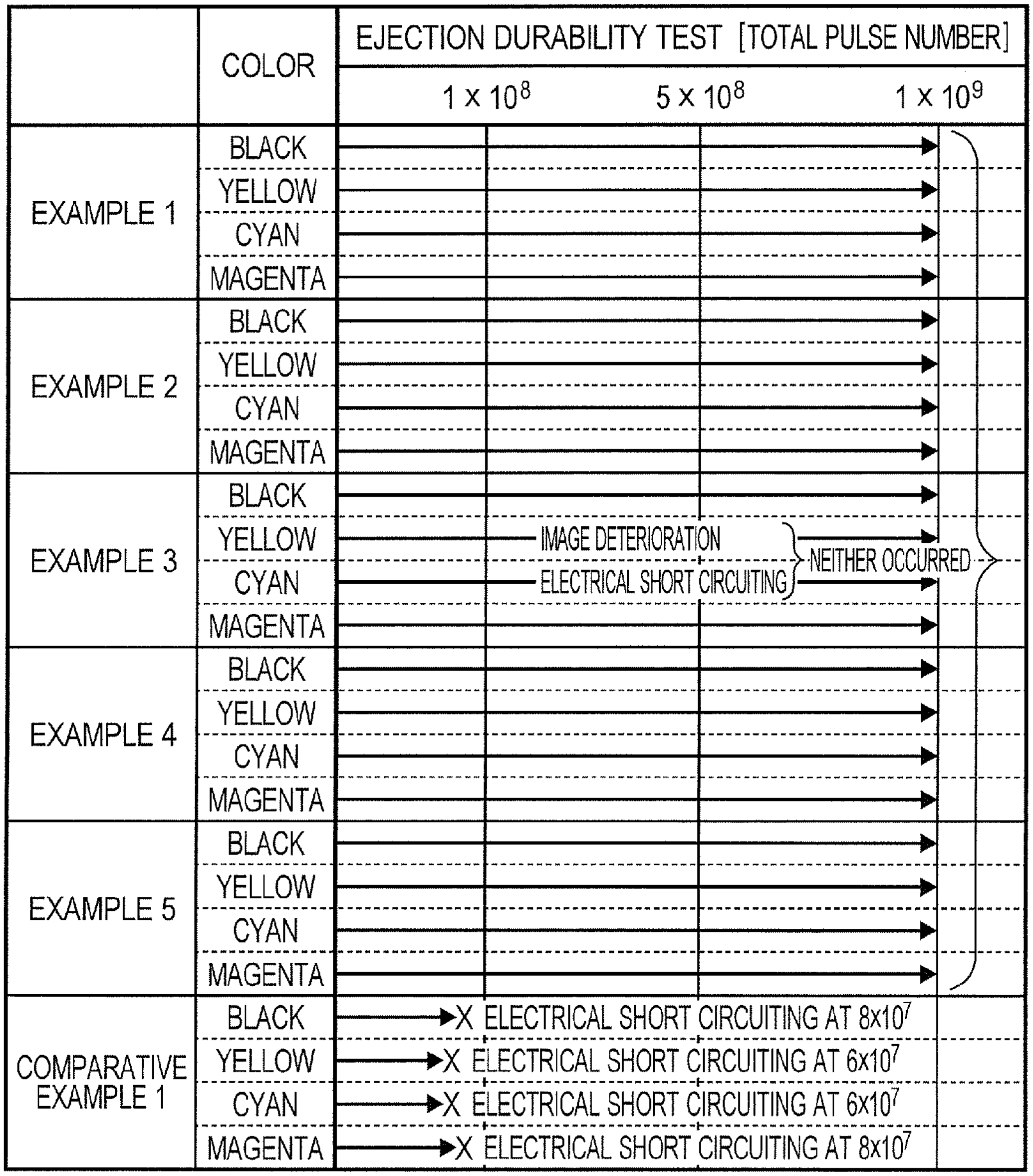
FIG. 15 is a view illustrating a result of an ejection durability test with the use of an ink jet head unit on which an ink jet recording head is mounted that has been produced in Examples 1 to 4 and Comparative Example 1.

FIG. 15 shows the result of having mounted each of the ink jet recording heads which have been produced in Examples 1 to 5 and Comparative Example 1 on the ink jet recording head unit having a form illustrated in FIG. 12, having filled the ink tank with inks of four colors having the following compositions, and having conducted an ejection durability test.

The composition of the ink of the four colors is described below, which has been used in the ejection durability test. The total amount was set at 100 parts by mass.

Dye X part by mass
Thiodiglycol 15 parts by mass
Triethylene glycol 15 parts by mass
Black ink: Dye C.I. Food black 2 3.5 parts by mass
Yellow ink: Dye C.I. Direct yellow 86 2.0 parts by mass
Cyan ink: Dye C.I. Acid blue 9 2.5 parts by mass
Magenta ink: Dye C.I. Acid red 289 3.0 parts by mass
Pure water Balance As illustrated in FIG. 15, the ink jet recording heads which had been produced in Examples 1 to 4 of the present invention did not cause a degradation of a printed image, an electrical short circuit and the like, even after the number of driving pulses of $1\times10^9$ [total pulse number] had been applied to the heater. On the other hand, the ink jet recording head which had been produced in Comparative Example 1 caused the electrical short circuit and the degradation of the printed image due to the ink that accumulated in a large recess formed in the vicinity of the ejection port, before the number of driving pulses of $1\times10^8$ [total pulse number] would be applied to the heater.

The ink jet recording heads which had been produced in Examples 1 to 4 were observed after the ejection durability tests. As a result, corrosion due to the ink was not observed, because the inner peripheral portion of the above described independent supply port was formed of the thermal oxide film, the heater material film and the cavitation resistant film (Ta film).

The method for producing the liquid ejecting head according to the present embodiment can control the dimension of the aperture in the first face side of the independent supply port with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-089179, filed Apr. 10, 2012, which is hereby incorporated by reference herein in its entirety.

What is claimed is:

1. A method for producing a liquid ejecting head comprising a substrate having an ejection energy generating element that generates energy for ejecting a liquid, on its first face, and an independent supply port that reaches the first face from a side of a second face that is opposite to the first face, the method comprising:

(1) a step of forming an etching stop layer on a portion corresponding to a region in which the independent supply port is formed, on the first face;

(2) a step of conducting a dry etching treatment for the substrate from the second face side until an etched portion reaches the etching stop layer; and (3) a step of removing the etching stop layer by isotropic etching to form the independent supply port, after having conducted the dry etching treatment, wherein the isotropic etching is conducted in such a state that a side etching stopper portion having an etching resistance to the isotropic etching is formed in a side face perimeter of the etching stop layer, and wherein the side etching stopper portion comprises a metal containing Ta as a main component.

2. The method according to claim 1, wherein the isotropic etching is a wet etching treatment.

3. The method according to claim 1, wherein a dimension of an aperture on a first face side of the independent supply port is defined by the side etching stopper portion.

4. The method according to claim 1, wherein the step (2) is a step of forming a plurality of independent supply ports in a bottom portion of a common supply port that has been formed by etching conducted from the second face, by conducting the dry etching treatment.

5. The method according to claim 1, wherein the dry etching treatment is reactive ion etching.

6. The method according to claim 1, wherein the etching stop layer is formed by arranging a silicon dioxide film on the substrate using a plasma CVD method and patterning the silicon oxide film.

7. The method according to claim 6, wherein the dry etching treatment is conducted with an etching gas that contains a fluorine-based compound, and wherein the isotropic etching is conducted with an acidic aqueous solution as an etching solution that has a viscosity of 1.2 to 2.5 cps and a surface tension of 30.0 to 40.0 dyne/cm and contains hydrofluoric acid in a concentration of 1.0 to 10.0 mass % and ammonium fluoride in a concentration of 10.0 to 30.0 mass %.

* * * * *